US012809743B2

(12) United States Patent

Warren et al.

(10) Patent No.: US 12,809,743 B2

(45) Date of Patent: Nov. 24, 2026

(54) GENERATING AND USING AGGREGATE SPAN GRAPHS TO ANALYZE DISTRIBUTED MACHINE-DRIVEN PROCESSES

(71) Applicant: Oracle International Corporation, Redwood Shores, CA (US)

(72) Inventors: Jack Warren, Redwood Shores, CA (US); Siu Lun To, Redwood Shores, CA (US)

(73) Assignee: Oracle International Corporation, Redwood Shores (CA)

( * ) Notice: Subject to any disclaimer, the term of this patent is extended or adjusted under 35 U.S.C. 154(b) by 368 days.

(21) Appl. No.: 18/663,635

(22) Filed: May 14, 2024

(65) Prior Publication Data

US 2025/0355782 A1 Nov. 20, 2025

(51) Int. Cl.
*G06F 11/34* (2006.01)
*G06T 11/26* (2026.01)

(52) U.S. Cl.
CPC .......... *G06F 11/3495* (2013.01); *G06T 11/26* (2026.01); *G06T 2200/24* (2013.01)

(58) Field of Classification Search
CPC ........... G06F 11/3495; G06F 2201/865; G06T 11/26; G06T 2200/24
See application file for complete search history.

(56) References Cited

U.S. PATENT DOCUMENTS

2023/0252697 A1* 8/2023 Chung ................ G06F 11/3006 345/443
2024/0323095 A1* 9/2024 Beer ................... G06F 11/0709
2025/0061003 A1* 2/2025 Gunther .............. G06F 11/3419

OTHER PUBLICATIONS

"Flame Graphs", https://www.brendangregg.com/flamegraphs.html, May 14, 2024, 15 pages.

* cited by examiner

*Primary Examiner* — Craig C Dorais
(74) *Attorney, Agent, or Firm* — Mughal Gaudry & Franklin PC

(57) ABSTRACT

A process management system, method, and article are provided for generating and configuring aggregate span graphs to analyze process monitoring data. The process management system receives process monitoring data reporting on different instances of same and different processes. The process management system uses the process monitoring data to generate a structured object that identifies spans of processing time corresponding to processes involved in handling requests. The structured object includes, for each span: a unique identity of the span, a name of a process corresponding to the span, if the process was initiated by a parent, an identity of the parent, and a time during which the process ran. Using the structured object, the process management system generates a graph including sections. Each section represents spans having a process initiation path corresponding to the section and has a section width determined using an aggregate metric of spans in the section. The graph shows child spans stacked on parent spans.

20 Claims, 13 Drawing Sheets

GENERATING AND USING AGGREGATE SPAN GRAPHS TO ANALYZE DISTRIBUTED MACHINE-DRIVEN PROCESSES

BACKGROUND

Software provides a variety of services in a variety of contexts. These services are provided by computer systems that receive and respond to requests. For example, the computer systems may communicate with client devices over the Internet or another network to receive requests and provide responses. The computer systems may use back-end or server-side computer resources to answer the requests, such as server-side storage, server-side processing, and server-side architecture including software operating according to defined constructs.

These computer systems offer services to execute requests that may require complex processing. As part of executing these requests, computer systems may break up the complex processing into parts and use sub-processes, such as sub-processes performed by microservices or server-side services, to complete the requests.

Different requests may be executed with different efficiencies depending on a variety of factors, including, but not limited to, a current load on the computer system, a complexity of the request and a disparateness of the data requested, how the server-side code is written, whether or not similar requests have been previously received and, if so, whether any information was cached when processing similar requests, a structure of indexes and in-memory data on the computer system, an age and type of hardware used by the computer system, and even a temperature of an environment in which the computer system hardware is located.

When a computer system fails to process requests in a timely manner, users such as administrative users of the computer system, may analyze data about the requests to determine if there is a trend that can be fixed to improve processing of the requests. Sifting through data about processes that were executed and attempting to detect patterns and deduce potential remedies is a complex and time-consuming process. Analyzing large volumes of rows of data might not help an ordinary user to reliably detect any trend at all. As a result, users often fail to detect underlying problems that could be fixed to improve processing of the requests.

BRIEF SUMMARY

In some embodiments, a process management system, method, and article are provided for generating and configuring aggregate span graphs to analyze process monitoring data. The process management system receives process monitoring data reporting on different instances of same and different processes. The process management system uses the process monitoring data to generate a structured object that identifies spans of processing time corresponding to processes involved in handling requests. The structured object includes, for each span: a unique identity of the span, a name of a process corresponding to the span, if the process was initiated by a parent, an identity of the parent, and a time during which the process ran. Using the structured object, the process management system generates a graph including sections. Each section represents spans having a process initiation path corresponding to the section and has a section width determined using an aggregate metric of spans in the section. The graph shows child spans stacked on parent spans.

In one embodiment, a computer-implemented method includes receiving process monitoring data that includes a first set of process monitoring data reporting on a first instance of a first process that handled part of a first request and a second set of process monitoring data reporting on a first instance of a second process that handled part of the first request. The first set of process monitoring data includes a first run time of the first instance of the first process, and the second set of process monitoring data includes a second run time of the first instance of the second process. The process monitoring data also includes a third set of process monitoring data reporting on a second instance of a first process that handled part of a second request and a fourth set of process monitoring data reporting on a second instance of a second process that handled part of the second request. The third set of process monitoring data comprises a third run time of the second instance of the first process, and the fourth set of process monitoring data comprises a fourth run time of the second instance of the second process. The computer-implemented method includes using the process monitoring data to generate a structured object that identifies a plurality of spans of processing time corresponding to a plurality of processes handling a plurality of parts of requests. The structured object includes, for each span, of the plurality of spans, corresponding to a process of the plurality of processes: a unique identity of the span, a name of the process corresponding to the span, if the process was initiated by a parent process, an identity of a parent span corresponding to the parent process, and a time during which the process ran. Based at least in part on the structured object, the computer-implemented method generates a graph including a plurality of sections. Each section of the plurality of sections represents spans having a process initiation path corresponding to the section. A width of the section is based at least in part on an aggregate metric for spans having the process initiation path corresponding to the section. The graph comprises sections corresponding to child spans stacked on other sections corresponding to parent spans.

In a further embodiment, the computer-implemented method includes receiving a selection of an option to filter out parallel spans from the graph, and, based on the selection, filtering, from the graph, one or more particular spans that are parallel to one or more other spans based on one or more processes corresponding to the one or more particular spans not independently contributing to a total runtime of request handling. The filtering is performed without filtering, from the graph, one or more particular other spans that are not parallel to one or more other spans based on one or more other processes corresponding to the one or more other particular spans independently contributing to the total runtime of request handling.

In the same or a different embodiment, the computer-implemented method further includes showing, in a first region of the graph, one or more particular spans that are parallel to one or more other spans based on one or more processes corresponding to the one or more particular spans not independently contributing to a total runtime of request handling. In this embodiment, the computer-implemented method includes showing, in a second region of the graph, one or more other spans that are not parallel to other spans based on one or more other processes corresponding to the one or more particular other spans independently contributing to the total runtime of request handling.

In the same or a different embodiment, the computer-implemented method further includes displaying an option to stack the sections corresponding to child spans on top of the sections corresponding to parent spans, under the sections corresponding to parent spans, to the left of the sections corresponding to parent spans, or to the right of the sections corresponding to parent spans. Upon receiving a selection of an option that does not match the graph, the computer-implemented method includes adjusting an orientation of the graph.

In the same or a different embodiment, the computer-implemented method further includes receiving a selection of a particular process to include in the graph. The particular process comprises the first process and the second process. Based on the selection, the computer-implemented method adds, to the graph, spans corresponding to at least the first process and the second process. In this embodiment, at least some process names overlap between different instances of the particular process.

In another embodiment, the computer-implemented method further comprises receiving a selection of a first particular process and a second particular process to include in the graph. The first particular process comprises the first process and the second process. Based on the selection, the computer-implemented method adds, to the graph, spans corresponding to at least the first particular process and spans corresponding to at least the second particular process. In this embodiment, at least some process names do not overlap between the first particular process and the second particular process.

In various embodiments, the plurality of sections may be colored based at least in part on, for each section, another aggregate matric for spans having the process initiation path corresponding to the section.

In various embodiments, the aggregate metric for spans having the process initiation path corresponding to the section comprises a sum, median, or mean of metric values for spans having the process initiation path corresponding to the section. In another embodiment, the aggregate metric for spans having the process initiation path corresponding to the section comprises a frequency of spans having the process initiation path corresponding to the section.

In the same or a different embodiment, the graph is a first graph, and the computer-implemented method further includes receiving a selection of one or more criteria for the first graph and one or more other criteria for a second graph. The one or more criteria differ from the one or more other criteria. The computer-implemented method further includes displaying the first graph and the second graph concurrently. The first graph and the second graph differ based on differences between the one or more criteria and the one or more other criteria.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
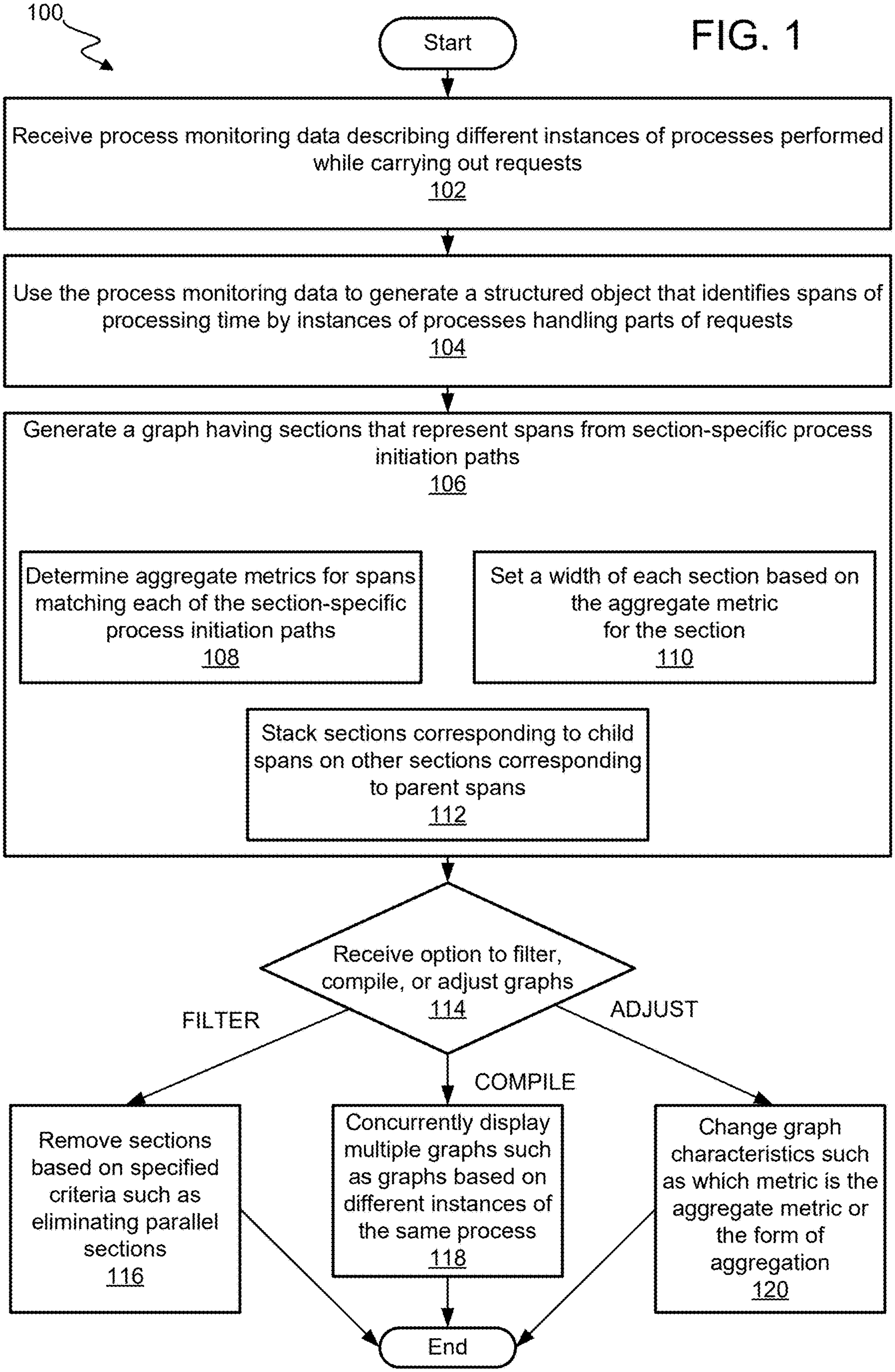
FIG. 1 illustrates a flow chart of an example process for generating and modifying an aggregate span graph having sections that represent spans from section-specific process initiation paths.

A process management system is described for generating and configuring aggregate span graphs to analyze process monitoring data. The process management system uses process monitoring data reporting on different instances of same and different processes to generate a structured object that identifies spans of processing time corresponding to processes involved in handling requests. Using the structured object, the process management system generates a graph including sections. Each section represents spans having a process initiation path corresponding to the section and has a section width determined using an aggregate metric of spans in the section. In this manner, the process management system manages process monitoring data to support analysis of various processes that may be monitored. In various embodiments, the process management system is implemented using non-transitory computer-readable storage media to store instructions which, when executed by one or more processors of a computer system, cause display of a user interface and processing of received input to generate aggregate span graphs. The process management system may be implemented on a local or cloud-based computer system that includes processors and a display for showing the user interface to a user for generating and analyzing aggregate span graphs. The computer system may communicate with client computer systems for generating and/or displaying aggregate span graphs.

A description of generating and modifying an aggregate span graph having sections that represent spans from section-specific process initiation paths is provided in the following sections:

TRACES TO MONITOR PROCESSES
DISTRIBUTED AND PARALLEL EXECUTION
HIERARCHICAL DATA STRUCTURES
MERGING SPAN PATHS
AGGREGATE SPAN GRAPH GENERATION
AGGREGATE SPAN GRAPH METRICS
ANALYSIS OF PARALLEL PATHS
COMPILING AGGREGATE SPAN GRAPHS
COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. The use of the terms “first,” “second,” “third,” and “fourth” is to separate distinct items so the items may be referenced separately and does not infer any order of the items unless otherwise stated. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Traces to Monitor Processes

Process monitoring data such as trace files, transmitted or encapsulated data chunks, such as spans sent over a network, and/or other log data, any of which are referred to herein as “traces,” are reported from microservices and other processes during operation of the microservices or other processes as they complete transactions or otherwise handle requests. A trace may include a collection of spans of log data that are generated as an application or user request is processed in a distributed manner by a system. A trace may be limited to a single request or cover multiple requests. As used herein, a trace is process monitoring data associated with a single user request, and a trace may cover one or more monitored process instances for the single user request. Process monitoring data may include one or more traces in a same or different transmitted communication. Process monitoring data such as traces and other log data are collected in a distributed tracing system and reported to a centralized repository of process monitoring data or otherwise stored in a manner accessible for analysis. Manual review of traces can be tedious and time-consuming, even if the data is organized for review.

A distributed tracing system may have a predetermined format for emitting information about traces and spans from different components. Spans are named durations of time for which traces of operations were emitted. Spans of traces may be related to other spans, such that each span may or may not have a parent span and zero, one, or more child spans. For example, a root span has zero parent spans, and a non-root span has a parent span to form a tree of spans. The parent span logs an operation or other process that was running for a duration, and the child span logs an operation or other process that was initiated during the parent span and also ran for a duration. A parent process, corresponding to a parent span, may initiate more than one child operation to run serially, concurrently in parallel, or at least partially concurrently (and partially parallel). The emitted trace information may be sent to a central system, which may be queried to view the traces. The trace information may also be visualized to see the parent-child relationships and durations.

Each of the operations represented by the spans may be a request to execute a task or otherwise complete a job on a service, such as a microservice. The parent and/or child services may be performing different operations on different services at the same time, but some of the services may require information from others of the services to start, make progress on, or complete the job. Different services or microservices may divide a job into smaller parts and call other services or microservices to complete part(s) of the job. A span may be logged as starting when the service or microservice is requested to start a job, receives the request, accepts the request to start the job, and/or begins working on the request, and completed when the service or microservice completes the job, reports completion of the job, and/or when the reported completion is received or processed. In this manner, spans may be nested, further nested, and further nested, until spans start completing jobs to close spans, which lead to completion of other jobs to close other spans, and so on.

Tracing tools like Grafana Tempo® report and analyze traces using open source tracing protocols such as those provided by the distributed tracing systems of Jaeger, Zipkin, or OpenTelemetry. In one example, hierarchical trace spans may be stored using JavaScript Object Notation (JSON) or any other structured data format that stores spans and references between spans and parents of the spans, if any. The structured data may store spans, attributes of spans including a start time and end time, and relations between spans, and the structured data may be transmitted over a network in a message between components of the tracing platform, for example, to be included in a repository of tracing data. As used herein, “run time” refers to a time associated with when a process was executed, including, for example, a start time and/or an end time and/or a difference between the start time and end time and/or another measure of duration. Different systems, such as systems implementing or using microservices, may emit structured data in a similar or different format for consumption by a span ingestion system that stores the structured data of same or different formats.

Instances of individual processes being traced may be identified using a trace ID. A consumer of the process and an executor of the process may both report on attributes of the process using the same trace ID, which may correspond to an application or user request as various parts of the request are gathered by the system. For example, a web site may trigger a process and call one or more microservices to carry out the process. A server hosting a web site may cause creation of the trace ID to track progress of the microservices in carrying out each process triggered by the web site. The overall process may complete when the web site returns a result of executing various parts of the process across microservices.

Structured files containing the trace ID may be merged together so attributes for the trace ID spread across the different files may be viewed together in an analytics tool. Regardless of whether the trace information was reported by different actors or in different files or at different times, the trace information may be stitched together using a common trace ID that is propagated as the process gets executed using various resources and microservices. The trace ID may be generated at the beginning of a pipeline that consumes distributed resources. An actor or parent process instance at the beginning of the pipeline may pass the trace ID to child process instances, and the child process instances may report, to the span ingestion system, trace information for that trace ID in a same process monitoring communication as used for the parent process instance or in separate process monitoring communications. For example, the process monitoring communications may report on one or more process instances that may each have various reported attributes including, but not limited to:

- a logged time in which the process instance was requested by the consumer, as reported by the consumer,
- a logged time in which the request was received by the executor of the process instance, as reported by the executor,
- a logged time in which the request was completed by the executor, as reported by the executor,
- a logged time in which the request was reported completed by the executor, as reported by the executor,
- a logged time in which the report of completion was received by the consumer, as reported by the consumer,
- an amount of memory consumed in processing the request, as reported by the executor or by a memory resource,
- an amount of processing time consumed in processing the request, as reported by the executor or a processing resource, etc.

Distributed and Parallel Execution

Microservices or other functional components may be used to perform independent sub-operations in parallel. In other words, different sub-operations may be performed concurrently, at least partially overlapping, using at least some different computational resources. Systems designed to handle complex requests may include an orchestration process to break down larger processes into smaller sub-processes, and sub-processes to handle specific aspects of the larger processes. The sub-processes may be scalable such that different instances of the sub-processes are working on aspects of different requests in parallel, or working on different aspects of the same request in parallel.

Distributed tracing is a solution for tracking a request as it flows through the different microservices or components. Each trace captures information about process instances for a specific application or user request or transaction and includes "spans" which are named, time intervals of interest representing a well-defined operation or other process. For example, there may be a span around each microservice invocation that indicates how much time is spent inside that microservice, and the name of the microservice may be used as the span name.

A span is a timed interval of interest that may represent calls to microservices or operations within a microservice. The span may be labeled with the service and operation name, if applicable. The spans may have parent-child relationships, where a child span is included as part of the parent span, which generates the log. Sibling spans may also be included as part of the same parent span, and the sibling spans may be executed in series or in parallel with each other.

The process monitoring architecture is extensible. Developers of processes may choose to instrument code or integrate with process monitoring tools to create additional spans (e.g. around SQL executions) within a microservice to provide a finer-grained breakdown of where time is spent. Spans can have parent-child relationships that can be extended by finer-grained reporting by sub-processes executed in the pipeline. The traces and spans are sent to a common collection system, which may include a user interface to view individual traces.

In one embodiment, OpenTracing, OpenCensus, and/or OpenTelemetry are used for distributed tracing. OpenTracing, OpenCensus, and/or OpenTelemetry provide APIs and corresponding specifications and implementations for distributed tracing. Tools and user interfaces that support viewing OpenTracing, OpenCensus, and/or OpenTelemetry traces may provide functionality to search for traces, view each trace individually, compare traces, analyze time breakdowns of spans, finding where in traces an error occurred, and finding a frequency of an error.

When there are a large number of traces, the individual viewing of traces makes it difficult to detect common patterns across traces. For example, if there are 1000 traces for requests that are slow, viewing each trace of a subset or even all of the traces may not bring a user any closer to finding common patterns that cause slowness. Even if a pattern is observed in a subset of the traces, the pattern may not be consistent among the full set of traces.

In one embodiment, traces may be viewed in aggregate by extracting out the spans and grouping by span name or another shared characteristic. For example, span names that have the highest average elapsed time may be grouped together, allowing the user to more easily detect patterns in a more focused sample of traces.

Grouping traces by a common characteristic may result in the loss of parent-child relationships among the spans. Without the parent span information, the user may have difficulty understanding why an operation is getting executed and how the operation is connected to the larger system. The lack of parent-child relationship information could inhibit identification of potential optimizations to the parent components that may be able to fix a problem before the problem appears in the child component, or optimizations in the child component that could prevent problems before they occur in the parent component. For example, the parent may cache certain results so that results do not need to be recomputed by the child. As another example, the child could return data in a particular format that is expected by the parent to prevent the parent from spending time to transform the data into a different format.

Hierarchical Data Structures

In one embodiment, traces are converted into hierarchical data structures that preserve parent-child relationships between operations. In one example, JSON files are used to store the traces with parent-child relationships. The JSON files may store a list of spans with information such as traceID, spanID, parentSpanID (if the span has a parent), name, start-time (e.g., startTimeUnixNano), end-time (e.g., endTimeUnixNano), kind (e.g., to distinguish sources of trace data), and/or traceState (e.g., to report trace status). The name provides a field to aggregate same processes that are performed as different process instances at different times. For example, a same-named process may execute as several different process instances at several different times to support a same or different requests. The different process instances may have the same name but different start times and/or end times, different span IDs and/or parent span IDs, and/or different trace IDs, but the process instances may share a name due to a common underlying functionality between the process instances. For example, the process instances may be served by a same or similar code base, a same API, or a same service or microservice that has been instantiated multiple times, and this common architecture of the processes may lead to a common process reporting agent to report a same name to a process monitoring agent.

In one embodiment, traces represented in a JSON or other structured object may be converted into an object structure that can be loaded into memory in a target programming language, such as Python or any other programming language. For example, the JSON structure may be loaded into a data structure in the target language that can be loaded into memory for the purpose of generating an aggregate span graph. In one example, the JSON files are processed to save the spans as structured object(s) in Python or any other structured object consumable by a code base. The object may include Trace ID, Span ID, Parent Span ID, Service and Operation Name, Start Time, and Duration. A span object may be constructed to model each trace tree based on the parent-child relationships between the spans.

The hierarchical data structures may include many levels of parent-child relationships. For example, a root span may have no parents, and children of the root span may all share the root span as a parent. Some of the children of the root span may have further children, which are grandchildren of the root span, and those grandchildren may have children, which are great grandchildren of the root span. A span is a child of another span if the span was initiated by or on behalf of the other span, for example, to complete a task being handled by the other span.

In one embodiment, multiple CSV or JSON files may be consumed to generate a combined aggregate span graph with information from multiple files, or multiple aggregate span graphs, each specific to the different files. Aggregate span graphs such as flame graphs may be displayed for the sets of CSV and/or JSON files on the same HTML page. Display of the different aggregate span graphs may allow for comparison of the different sets of traces.

Merging Span Paths

Although traces may be structured and organized, analyzing traces by trace ID may be onerous unless the analysis has a focused set of trace IDs for review. In large distributed systems that complete high numbers of processes, the trace IDs being generated by the distributed system may be increasing in number faster than they can be ingested and analyzed by a reviewer. Due to the complexity and wide range of hierarchies in traces, attempting to merge many traces together into a single file would not inherently reduce the amount of data that needs to be reviewed, as each trace differs in potentially many different ways, for example by having different trace attributes, a different start time, a different end time, and different processes and/or sub-processes and/or combinations thereof involved.

Various examples are provided for intaking process monitoring data to generate a data structure that can be used to generate an aggregate span graph.

Example 1

Figure 7A:
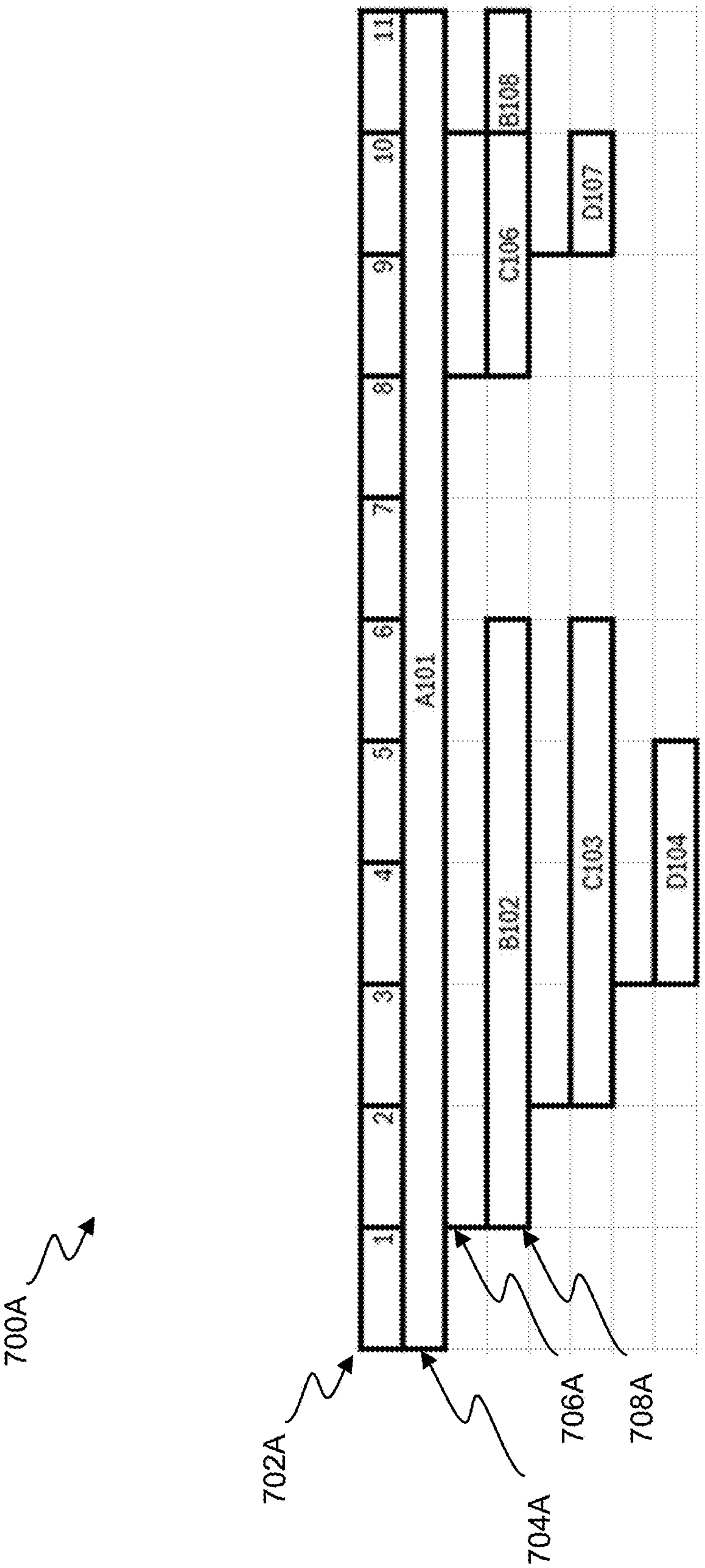
FIGS. 7A-7C provide illustrative example diagrams of the various processes and runtimes represented by process monitoring data.

In a first example, Example 1, a trace or other process monitoring file may be converted into an intermediate format, such as a text file, that records span paths with respective runtimes. The data involved in Example 1 is shown in diagram 700A of FIG. 7A for illustrative purposes. In the example, a span tree represents a root process 704A having span name A101 running from 0 seconds to 11 seconds, as indicated by the time markers 702A. Root process 704A spawns (for example, as indicated by line 706A) three child processes, B102 (1 second to 6 seconds), C106 (8 seconds to 10 seconds), and B108 (10 seconds to 11 seconds), that are not concurrent with each other. Child process B102 is marked as child process 708A for illustrative purposes. In turn, child processes B102 and C106 each span their own child processes C103 (2 seconds to 6 seconds) and D107 (9 seconds to 10 seconds), respectively, and C103 spawns a child process D104 (3 seconds to 5 seconds). The traces reporting these processes may be converted into an intermediate format that lists each span path and a runtime (end time-start time) attributable to the span path (after subtracting other child span paths that separately contribute to the runtime), such as a runtime that is not accounted for by other span paths: A101→B102→C103→D104: 2 seconds (5 seconds−3 seconds); A101→B102→C103: 2 seconds (6 seconds−2 seconds−2 seconds already accounted for from D104); A101→B102: 1 second (11 seconds−10 seconds); A101→C106→D107: 1 second (10 seconds−9 seconds); A101→C106: 1 second (10 seconds−8 seconds−1 second already accounted for from D107); A101→B108: 1 second (11 seconds−10 seconds); A101: 3 seconds (11 seconds−1 second already accounted for from B108−2 seconds already accounted for from C106 and children−5 seconds already accounted for from B102 and children). In this example, the spans are considered non-parallel because each span child is below a section above the span and within the time boundaries of the span above.

The paths may be simplified by referring to a span type without referring to an instance of the span that was actually being reported in the traces. In the example, the numbers or other suffix may represent the instance of the span, and the letters or other prefix may represent the span type. After removing instance-specific details, the span path log simplifies to: A→B→C→D: 2 seconds; A→B→C: 2 seconds; A→B: 1 second; A→C→D: 1 second; A→C: 1 second; A→B: 1 second; A: 3 seconds.

Example 2

Figure 7B:
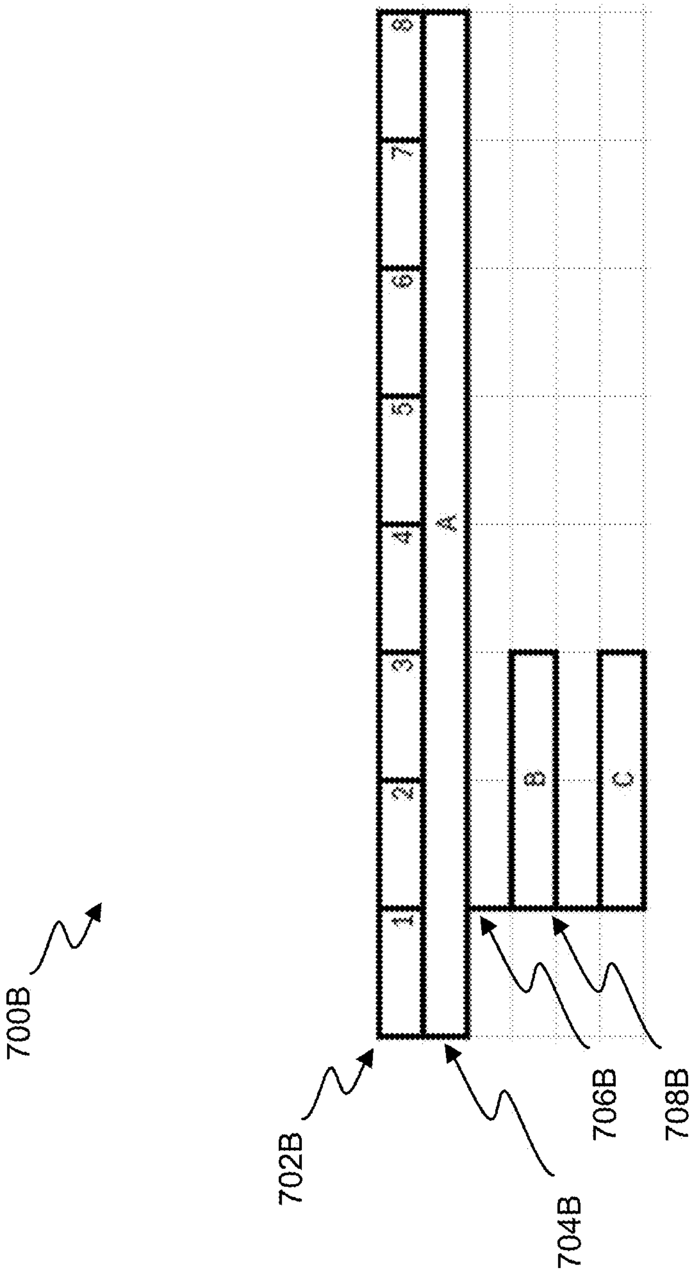

A second example, Example 2, is provided to show that span paths from different traces may be merged together using a simplified span path notation. The data involved in Example 2 is shown in diagram 700B of FIG. 7B for illustrative purposes, with time markers 702B, root process 704B, spawn indication 706B, and example child node 708B. In Example 2, a trace may include process monitoring data that describes span paths that simplify to: A→B→C: 2 seconds; and A: 6 seconds (total of 8 seconds minus 2 seconds). The examples may be merged together to combine span paths of traces in Example 1 and Example 2, which, in the examples, may include: A→B→C→D: 2 seconds; A→B→C: 2 seconds; A→B: 1 second; A→C→D: 1 second; A→C: 1 second; A→B: 1 second; A: 3 seconds; A→B→C: 2 seconds; A: 6 seconds.

Figure 3A:
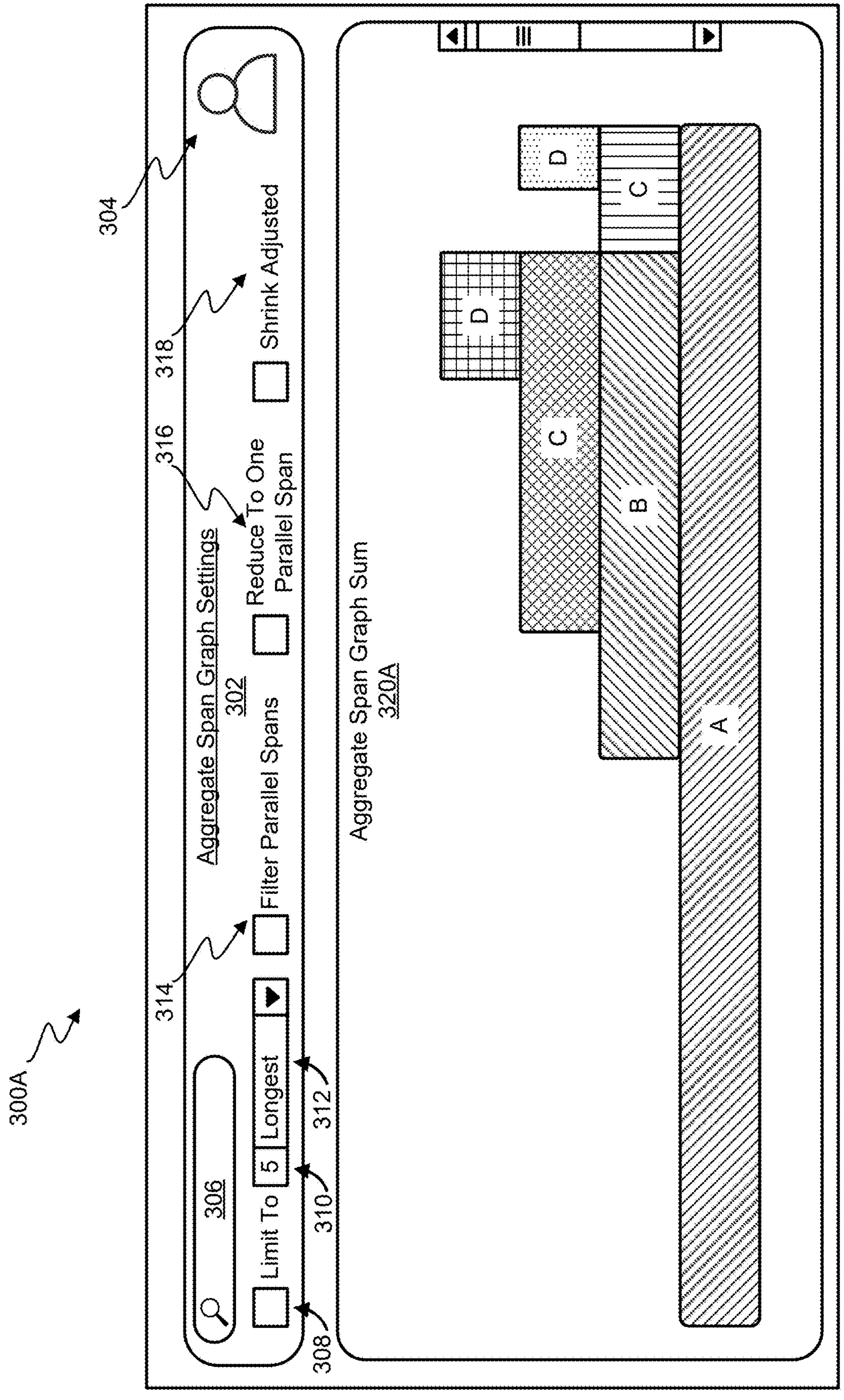
FIGS. 3A, 3B, 3C, and 3D illustrate diagrams of example user interfaces for displaying and modifying aggregate span graphs.

After merging the span path data, a final list of span paths and values may be used to generate aggregate span graphs such as aggregate span graph sum 320A of FIG. 3A. FIGS. 3A, 3B, 3C, and 3D illustrate diagrams of example user interfaces for displaying and modifying aggregate span graphs. As shown in the example interface 300A of FIG. 3A corresponding to Examples 1 and 2, A has 9 out of 19 seconds or 9/19 of the section width that is accountable to A alone, 7/19 of the section width accountable to A→B and children, and 2/19 of the section width accountable to A→C and children. Further, A→B has 5/7 of the section width accountable to C and children, and A→B→C has 2/5 of the section width accountable to D. A→C has 1/2 of the section width accountable to D.

FIG. 3A also shows options to limit the process instances shown to the N (5 as shown) longest process instances via checkbox 308 and configurable option 310 for N and option 312 for "longest" process instances. Other options for option 312 may include, in a drop-down menu for example, shortest, median, random, most recent, least recent, etc. Interface 300A also includes options for filtering parallel spans 314 or reducing to one parallel span 318. User interface 300A may also include an option 306 to search process instances for process names and/or durations that satisfy criteria provided in search box 306. For example, instances of processes may be found based on process names, process durations, specified locations or directory paths where the process monitoring data is located, or other criteria. A user account indicated by user graphic 304 may be tied to stored configuration settings that are loaded when the user account is logged into the process management system. Different user accounts may have different aggregate span graphs saved as dashboards to consume live data and show the live data to the user as the user logs into an application for use, whether for the purpose of process management or for some other purpose.

Aggregate Span Graph Generation

FIG. 1 illustrates a flow chart of an example process 100 for generating and modifying an aggregate span graph having sections that represent spans from section-specific process initiation paths. Process 100 starts in block 102, where a process management system receives process monitoring data. The process monitoring data describes different instances of processes performed while carrying out requests. For example, the process monitoring data may include information that describes execution of process instances by microservices or other services that support part of an overall process of fulfilling a client request, such as a request for data analysis that is carried out using microservices to complete sub-steps of the data analysis to prepare data and/or a result for consumption. The process monitoring data may include information about multiple overall requests by one or more users or applications at different times and the sub-steps involved in any of the multiple requests.

In a particular example, an aggregate span graph may represent two, three, or more different processes (e.g., a "first" and a "second" process) in different sections, and different logs may have been received to log different instances (e.g., a "first" instance, a "second" instance, a "third" instance, and a "fourth" instance) in which the processes have occurred at different times in the past. In the particular example, two different processes, such as process B and process C in various examples, may share a common parent process, such as process A in the examples, and the two sections corresponding to the two different processes (e.g., B and C) may be stacked on another section corresponding to the parent process (e.g., A). Data may be aggregated for the two different processes based on the multiple prior occurrences or instances for which data was logged for the processes. In other words, for a given process, the data is aggregated across different instances of the process, and the graph shows different processes in different sections. Although systems are described with reference to a few different instances of a few different processes for illustrative purposes, the graph may variably represent any number of process instances and any number of processes.

In block 104, the process management system uses the process monitoring data to generate a structured object that identifies spans of processing time by instances of processes handling parts of requests. The structured object may include, for each process instance, an identity of the process instance as well as an identity of a parent of the process instance. The parent of a particular process instance may be another process instance that called, invoked, spawned, or otherwise initiated the particular process instance. The parent identity information may be used to reconstruct or otherwise leverage a hierarchy based on which process instances initiated which other process instances.

In block 106, the process management system generates a graph having sections that represent spans from section-specific process initiation paths. The section-specific process initiation paths reflect the parent-child relationships, if any, along which process instances corresponding to the section were called or otherwise initiated, such that a section represents different process instances that were called or otherwise initiated along a same parent-child path. Different sections may represent process instances called or otherwise initiated along different paths, such that the process instances may be spread across sections of the graph based on the process initiation path.

The graph is referred to herein as an "aggregate span graph," which is any graph that has sections that represent spans from section-specific process initiation paths and for which an aspect of the graph, such as section width, is based on an aggregate metric across processes along the path of the section. Additional features may also be provided for aggregate span graphs. One example aggregate span graph is a flame graph, such as the flame graphs shown in FIGS. 3A-3D.

Generating the graph in block 106 involves determining aggregate metrics for spans matching each of the section-specific process initiation paths in block 108. Metrics may be summed or otherwise gathered for each span matching or fitting in a path of a section, and an aggregate metric may be based on the gathered metrics. For example, the aggregate metric for the section may be the sum of the metrics matching or fitting in the path, the average of the metrics, the median value of the metrics, the mode value of the metrics, a frequency by which the process instance occurs, a rolling average of the metrics, a rate of change or other trend in the metrics, or any other aggregation that takes multiple metrics into account that match or fit in the path. The metrics may reflect time consumed by the process instances, resources, such as storage or processor resources, consumed by the process instances, frequency of the process instances, or other quantifiable measurements of the process instances. Aggregate metrics for different paths may be determined and stored for further analysis.

The aggregate metrics from block 108 may be used to set a width of each section of the graph in block 110. For example, an aggregate span graph may have a width of a section that is based on how frequently process instances occurred for that path, based on an average time consumed by process instances along the path, and/or based on a median amount of memory consumed by the process instances along the path. In these examples, process(es) occurring more frequently, consuming more time, or consuming more memory may appear wider than other process(es) that occur less frequently, consume less time, and/or consume less memory.

In block 112, the process management system stacks sections corresponding to child spans on other sections corresponding to parent spans. The stacking may place child sections on top of, to the left or right of, or below parent sections, and the user interface may include options for changing the stacking display or orientation of the aggregate span graph according to a user-selected preference from a default or previously selected preference. Various examples of span graphs are shown in FIGS. 3A-3D, with child sections stacked on parent sections.

The user interface provided by the process management system may provide an option to filter, compile or adjust the graphs in block 114. If an option to filter the graphs is selected, in block 116, the process management system may remove sections of the graph based on specified criteria such as eliminating all or some of the parallel sections. As another example, sections may be filtered to include or exclude process names or processes running within or beyond threshold lengths. Other filters may remove sections corresponding to certain processes that are known to have fixed times that cannot be further improved, or sections that have already been marked with metadata as reviewed and/or optimized. If an option to compile graphs is selected, in block 118, the process management system may concurrently display, on the user interface, multiple graphs such as graphs based on different instances of the same process. An example compilation is shown in FIG. 3D. Various examples may include compilations that show differences or similarities between different instances of processes, which may be the same processes, overlapping processes that include some same processes and some different processes, or non-overlapping processes that do not include any same processes. If an option to adjust graphs is selected, in block 120, the process management system may change graph characteristics such as which metric is the aggregate metric or what form of aggregation to use (e.g., sum, mean, median, mode, frequency, etc.). Such changes may cause the process management system to retrieve previously determined aggregate metrics from a cached data structure or to determine anew or re-determine aggregate metrics corresponding to the selected characteristics. Process 100 concludes with causing display of a visualization such as examples shown in FIGS. 3A-3D.

Figure 2:
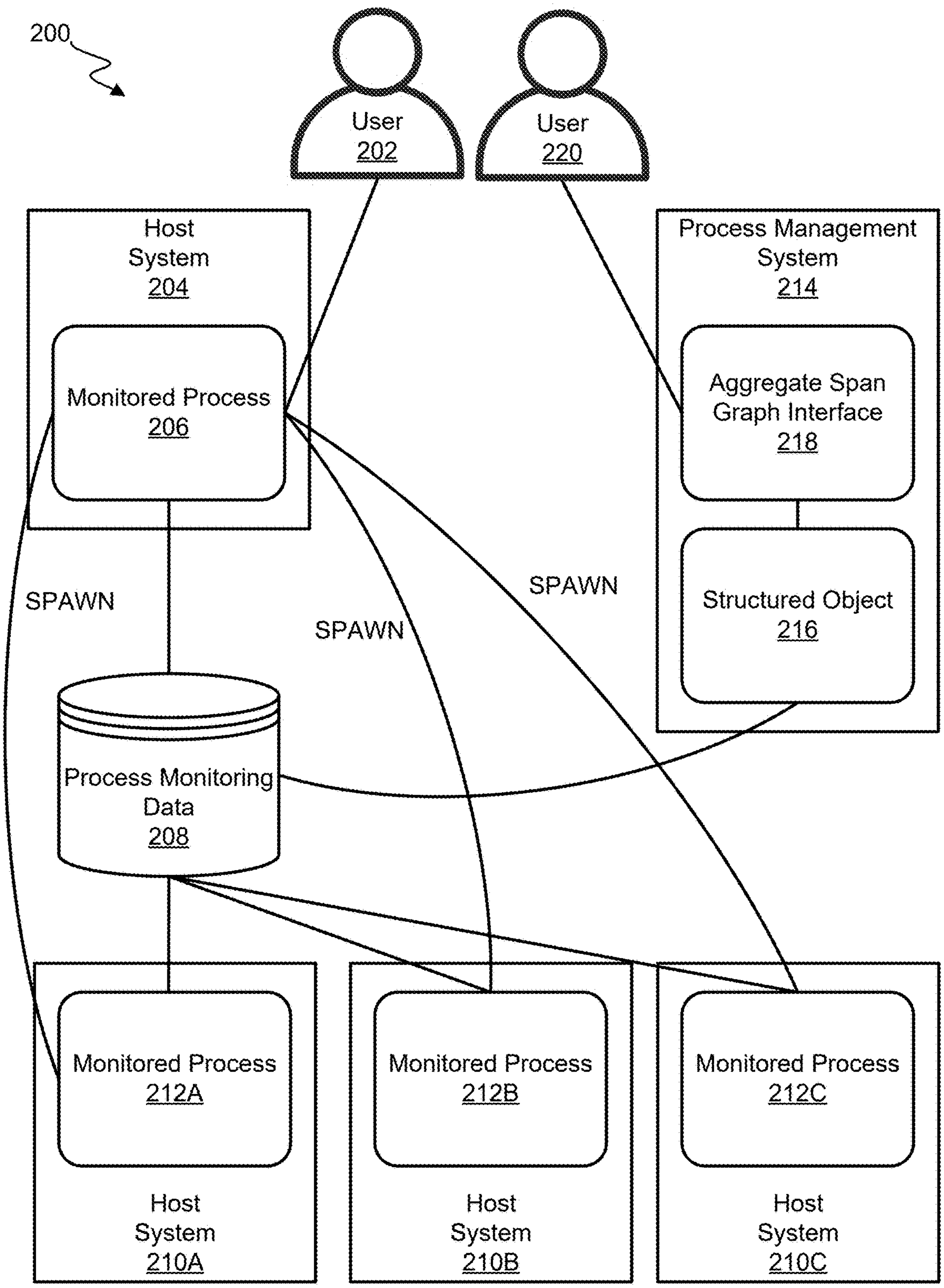
FIG. 2 illustrates a system diagram of an example system for generating and modifying an aggregate span graph having sections that represent spans from section-specific process initiation paths.

FIG. 2 illustrates a system diagram of an example system 200 for generating and modifying an aggregate span graph having sections that represent spans from section-specific process initiation paths. As shown, user 202 interacts with monitored process 206 on host system 204. For example, the monitored process 206 may be a process initiated based on a request for an overall task to be performed. The request may be tracked with data reported as process monitoring data 208, optionally using a tracing platform. In processing the request, monitored process 206 may log the request ID and initiate downstream monitored processes 212A, 212B, and/or 212C on host systems 210A, 210B, and/or 210C, respectively, which can use the request ID to report request processing metrics. As shown, host systems 204, 210A, 210B, and 210C are distributed systems that may interact over a network according to a network protocol, but any of host systems 204, 210A, 210B, and/or 210C may alternatively be local to a same machine reporting process monitoring data 208 to storage within the machine or outside the machine.

Also as shown in FIG. 2, user 220, which may be the same or a different user than user 202, interacts with aggregate span graph interface of process management system 214. Process management system 214 collects process monitoring data 208 into structured object 216, which tracks parent-child relationships in process monitoring data 208 and allows data along parent-child paths to be aggregated and stored. Structured object 216 is used to construct an aggregate span graph for display on aggregate span graph interface 218 to user 220.

The data structures constructed with hierarchical span data, reflecting parent-child relationships, may be used to generate aggregate span graphs such as flame graphs for visualization. Flame graphs are a visualization technique for viewing hierarchical data. In some examples, aggregate span graphs may be used for identifying commonly used code paths in CPU profiles. When analyzing common code paths in CPU profiles, the width of a portion of an aggregate span graph may correspond to a specific call tree based on how frequently the call tree occurs in the CPU profile. In this embodiment, the aggregate span graph may be constructed such that a width of each subsection maps to the frequency of that specific call stack, where a process represented by a given section is called by the process represented by the section directly below. The aggregate span graph can be used to visualize hierarchical data by visualizing a set of traces while preserving parent-child relationships and effectively display siblings that run in parallel. When analyzing wait times, the width of the aggregate span graph may correspond to the latency incurred by the specific call tree, still representing the parent-child relationships with children stacked on parents.

In one embodiment, the parent-child relationship between spans may be used to convert each series of traces into a corresponding call tree with an associated duration. Once converted, the call trees from multiple traces may be combined and fed to an aggregate span graph-generation script to generate aggregate span graphs to visualize traces in the aggregate. Once generated, the aggregate span graphs can be analyzed either individually or respectively compared against one another to visually view the differences between two sets of traces.

To construct an aggregate span graph, span paths may be computed for a set of traces, such as traces that have been selected for analysis via input, search, and/or filtering of available traces. The span paths with runtimes are determined and stored, such as in a text file. The text file is used as input to run an aggregate span graph generation script, which may be found for flame graphs, for example, on GitHub. The width of each section may vary in different flame graphs, with widths identifying total calls, call frequency per request, sum, median, or mean runtimes per span path.

An example aggregate span graph script takes in a text file as input containing span paths with respective runtimes. The span path information is converted into valid strings that are consumable with markers to indicate transitions in hierarchy levels. For example, the span paths may be separated by semicolons, such as "A;B", arrows such as "A→B", or any other delimiter understood by the aggregate span graph tool to indicate a separation between parent portions of the path and next child portions of the path.

In one embodiment, the aggregate span graph shows separate span paths, stacked based on a level of the path hierarchy in which the span path occurred. For example, span paths that occur at a root of the process may appear at the bottom, and span paths that are children of span paths that occur at the root of the process may appear a level above the bottom, with their children appearing a level above. The span paths may be stacked so that children are positioned above their parents, and so on. In one embodiment, the width of the span path entries on the aggregate span graph is based on a total number of times that the span path occurs in a data set represented by the aggregate span graph. In another embodiment, the width may represent a sum of attributable runtimes of spans fitting the span path in the data set. In yet another embodiment, the width may represent median, mean, or other aggregate determinations based on attributable runtimes of spans fitting the span path in the data set.

The aggregate span graph may be condensed to not include time periods that are not separately attributable to span paths being shown. Although the time periods of different span paths may overlap during execution, the aggregate span graph may show the spans adjacent to each other to better emphasize the width dimension of each span path as well as reducing white space on the aggregate span graph.

In one embodiment, a section of an aggregate span graph may be selected to drill into a chunk of code that runs during the code path corresponding to the section, or one or more historical inputs and/or outputs to a microservice that ran during the code path. In this manner, the aggregate span graph may be used to guide code optimization and/or debugging to focus on portions of the code that are causing the most independent processing delays.

In another embodiment, a section of an aggregate span graph may be selected to drill into metadata about analysis of code that runs during the code path corresponding to the section. The metadata may be updated on the user interface to log whether the user has analyzed opportunities to condense the code, parallelize the code further, reduce functionality offered by the code, or otherwise improve execution time for the code. The metadata may be viewed by a given user as well as other users of the user interface analyzing spans for the purpose of optimizing code that runs during the corresponding code path. For example, the section may link to a code management or task management page, such as one provided by Confluence®, logging characteristics, observations, and/or tasks in association with the code.

Aggregate Span Graph Metrics

Aggregate span graphs such as flame graphs can be used to display a variety of metrics, such as total, median, and average duration of given span paths. For example, if span B is a child of span A where span B runs for 3 seconds and 8 seconds on two separate occasions or "instances" of the process, a "sum duration" aggregate span graph would display the span path A to B lasting 11 seconds, while an "average duration" aggregate span graph would display the same path as lasting 5.5 seconds.

In one embodiment, the aggregate span graph is colored or shaded to distinguish different levels and different flow paths on the different levels. The shading may ensure that same-colored cells or other sections are not placed next to each other and add new shades and/or colors to ensure the full graph can be constructed without adjacent cells or other sections having the same color.

In another embodiment, the aggregate span graph is colored such that the color represents an average, sum, median, or frequency of a value of an attribute in the span graph. For example, the color may represent a different measurement of a same or different attribute than is shown in the width of the span path sections on the graph. In this embodiment, the user analyzing the aggregate span graph may be able to easily see, via a legend of graph colors, which span paths have certain attributes and which span paths do not. In a particular example, a width of the span path section may indicate an average time consumed by the span path, and a color of the span path section may indicate a frequency in which the span path section occurred in the data sample.

In another embodiment, the aggregate span graph section width and/or color may be determined based on a difference between two attributes or characteristics of the span path. For example, the top 10 time-consuming instances of a process may be shown in the aggregate span graph with a width or color based on a difference between the amount of time consumed by the span path in the sample of time-consuming instances as compared to the median time consumed by instances of the process, which may include the time-consuming instances and other instances that were not time-consuming. This view normalizes parts of the process that consume time across all instances of execution of the process and highlights parts of the process that consumed the most time for the most time-consuming instances of execution. In other examples, rather than subtracting the average or median metric, the aggregate span graph may consume a most performant or least time-consuming metric for the section from the data sample to show how much longer the particular instance of execution took than what may have been possible in another scenario.

In particular examples, a difference between execution time for a section of a target set of instances of execution may be less time-consuming than the average or median time consumed for that section in a larger or different sample. In this scenario, the negative differences may be color-coded to indicate that the target section is actually more performant than the comparison, or may appear in a different section of the flame graph such that the flame graph highlights only those sections that are less performant than the average or median corresponding sections in the larger or different sample.

Analysis of Parallel Paths

If the traces describe parallel spans that are part of an overall process, improving a performance of one span will not necessarily improve performance of the process as a whole. Others of the parallel spans may still consume a full amount of time even if some of the parallel spans are improved. Main spans may be tracked separately from parallel spans because main spans directly contribute to an overall time consumed by the process as a whole. If the main span is shortened, the process as a whole may be completed in less time. If a parallel span is shortened, the process as a whole may be completed in less time only if other parallel spans are also shortened.

The optimizations that might be made after an analysis of main path spans may include changing an order of operations, caching values, changing a scope of computations provided, changing an order of reporting, breaking up the process into smaller chunks of child processes that are also parallel, and/or upgrading hardware or software used to support the processes along the main spans. Any change may be made that reduces a time between when the microservice is called and when a result is returned from the microservice, and such change may be shown, via a further analysis of main paths, to predictably reduce a time consumed by an overall process.

Example 3

Figure 7C:
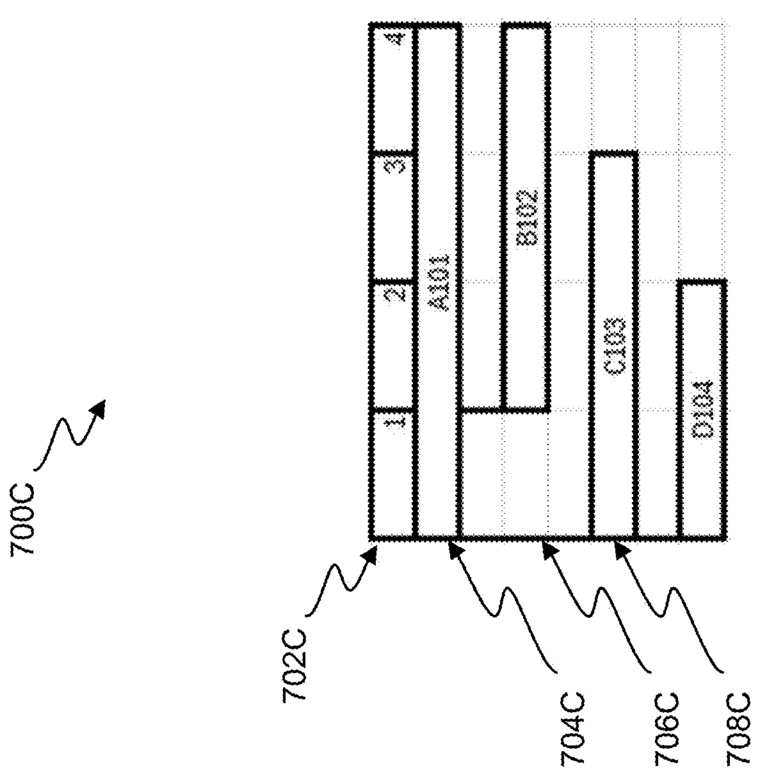

The data involved in Example 3 is shown in a diagram 700C of FIG. 7C for illustrative purposes, with time markers 702C, root process 704C, spawn indication 706C, and example child node 708C. In the example, process A101 (0 to 4 seconds) may spawn processes C103 (0 to 3 seconds) and B102 (1 to 4 seconds), which run at least partially concurrently. In this example, processes C103 and B102 are said to run in parallel with each other. Process C103 may also spawn process D104 (0 to 2 seconds), which may also overlap in runtime with B102. In the example, the flame paths may be specified as MAIN: A→C→D: 1 second (2 seconds−1 second accounted for by A→B); MAIN: A→B: 1 second (4 seconds−1 second−2 seconds already accounted for by A→C) to indicate that each path runs by itself with no parallel paths contributing to the overall time for 1 second. The flame path PARALLEL: A→B: 2 seconds may also be specified to indicate that B runs in parallel for 2 seconds with A→C, optionally discarding other parallel spans that run concurrently. In this example, the final list of span paths may include: MAIN: A→C→D: 1 second; MAIN: A→B: 1 second; PARALLEL: A→B: 2 seconds.

In a further example, a flame path PARALLEL: A→C: 1 second is also added based on the portion of C that runs in parallel with no children (3 seconds−1 second−1 second attributable to A→C→D), and/or a flame path PARALLEL: A→C→D: 1 second (2 seconds−1 second) is added based on the portion of D that runs in parallel with no children. In the example, the parallel portion of A→C→D is artificially split from the MAIN portion of A→C→D due to the overlap of the parallel portion with other processes. Including the parallel path examples with the main examples, the flame paths may include: MAIN: A→C→D: 1 second; MAIN: A→B: 1 second; PARALLEL: A→B: 2 seconds; PARALLEL: A→C: 1 second; PARALLEL: A→C→D: 1 second.

Extending the example further, a flame path MAIN: A: 1 second may also added based on the portion of A that runs before B is called. Even though other spans are running in parallel with this span, the span may be marked as MAIN or PARALLEL due to the portion's independent contribution to a runtime of the overall process. Marking the span as parallel reflects that other spans are running at the same time. On the other hand, marking the span as MAIN reflects that shortening A to call B quicker could lead to a shortening of the overall process since A→B independently accounts for the total process time as this path is the last-returning path in the process. In other words, a span that delays a call of a MAIN span may also be marked as a MAIN span. In this extended example, the flame paths may include: PARALLEL: A→C→D: 1 second (now marked parallel with the work of A on a later call of A→B); MAIN: A→B: 1 second; PARALLEL: A→B: 2 seconds; PARALLEL: A→C: 1 second; PARALLEL: A→C→D: 1 second; MAIN: A: 1 second.

Figure 3B:
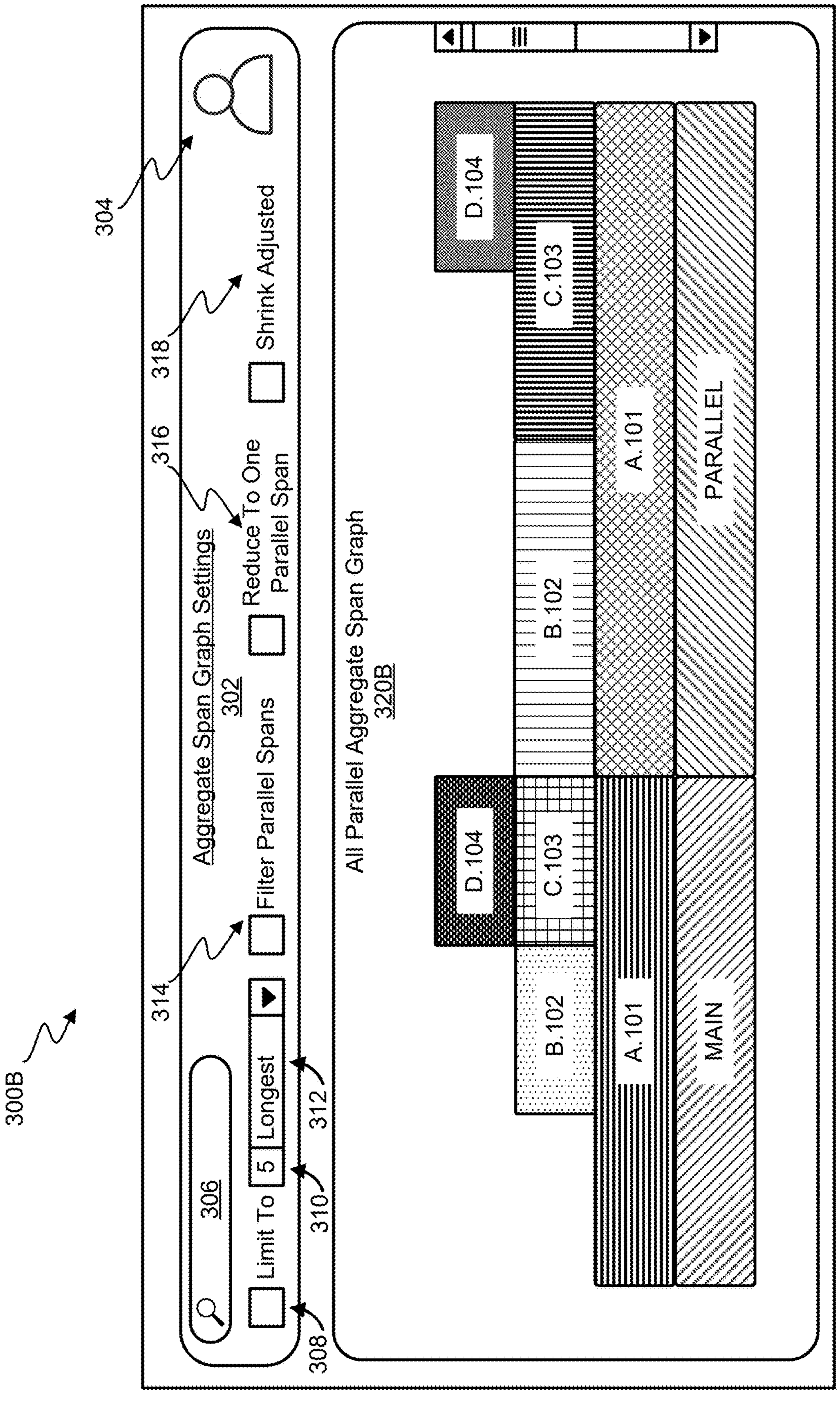
Figure 3C:
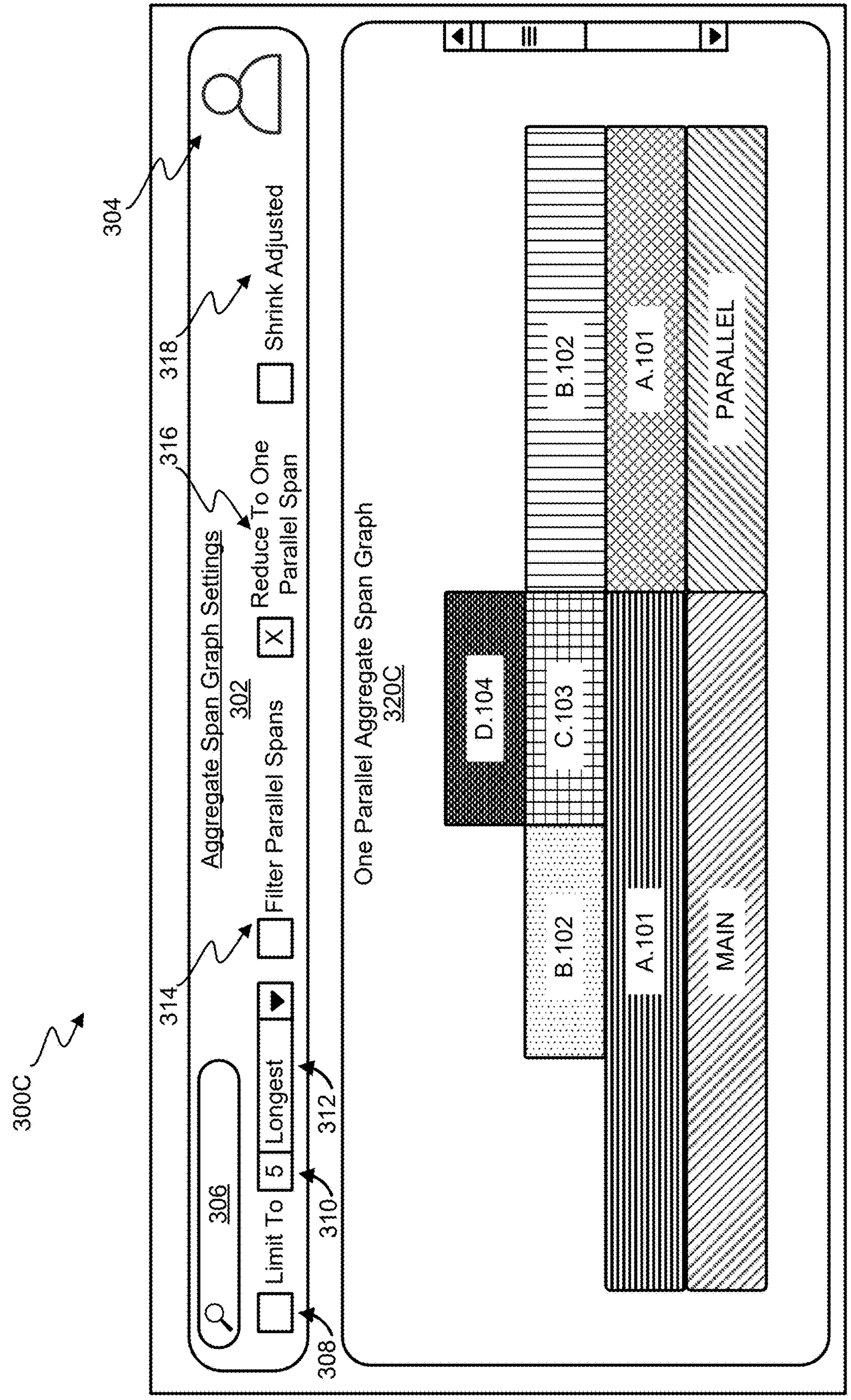
Figure 3D:
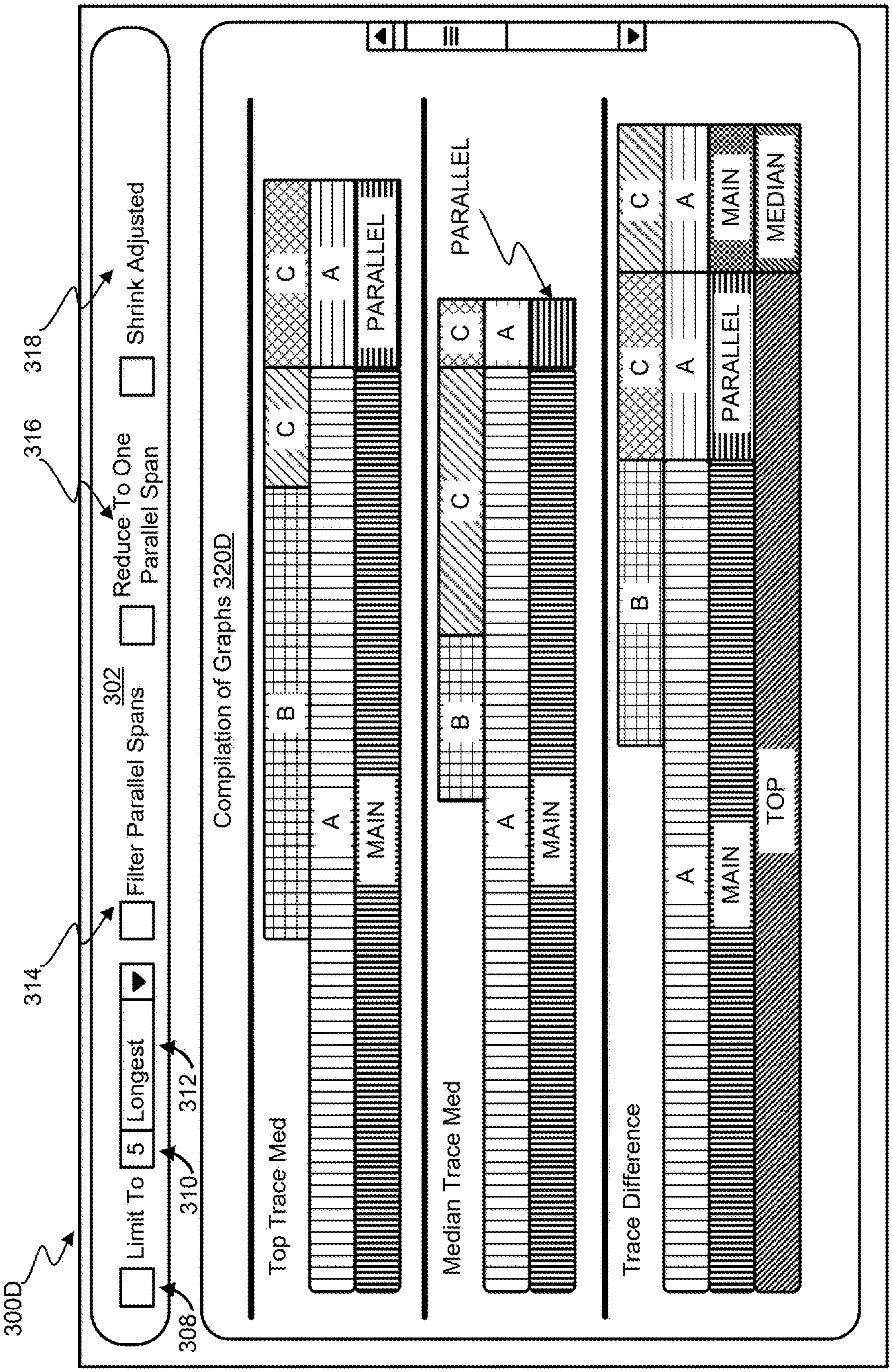

The parallel paths may be shown in an aggregate span graph such as example all parallel aggregate span graph 320B of FIG. 3B, which shows the portions marked above. As shown, 1/3 of the main path of A is attributable to A, 1/3 of the main path of A is attributable to B, and 1/3 of the main path of A is attributable to C, which is further attributable to D. Also as shown, 1/2 of the parallel path of A is attributable to B, and 1/2 of the parallel path of A is attributable to C, half of which is further attributable to D.

In one embodiment, the user interface includes an option 316 to reduce to one parallel span. The option has been selected in user interface 300C of FIG. 3C, where one parallel aggregate span graph 320C shows a similar main path as shown in FIG. 3B but a reduced parallel path that includes only the A→B path and not any other parallel paths. In another example, reducing parallel paths may show a one second portion of A→C→D that is parallel to the main path of A after excluding the portion of A→C→D that is parallel to A→B.

Multiple microservices or other components may be executing concurrently during a user request, some handling aspects of the user request and others handling aspects of other user requests. In one embodiment, the parallel operations or other processes may be shown side by side in an aggregate span graph. In this embodiment, the aggregate span graph may not indicate which of the operations, if tuned, would impact the overall user request time, as some operations may not be along the critical path of the overall user request.

Parent and corresponding children spans in a trace may be visualized as a tree of span paths that start at a root span. Different traces can share similar span paths. A span path may be identified by the service and/or operation name, and the span ID of each span along the path.

Each span path is logged to have run a set amount of time. The total runtime for a given parent span can be determined by summing the independent runtime contribution of the parent span and independent runtime contributions of the child spans along the parent's path.

In one embodiment, the aggregate span graph includes an additional layer with root frames called "main" and "parallel" to indicate whether a call path is along the main path or parallel to the main path. If a call path is marked as "parallel," then tuning the call path might not improve overall performance since the path is being executed in parallel with at least one other path. Improving the "main" path, on the other hand, would improve overall performance. The main branch includes the sections of spans that (1) do not run in parallel with any siblings and (2) have no ancestors that ran in parallel during the same time. The parallel branch contains the parts of all sections that (1) run in parallel with any siblings or (2) have some ancestor already in the parallel branch. In another embodiment, the main branch includes the sections of spans that independently contribute to the overall runtime by delaying the call of any other main branch or by being a latest-ending branch that is not ending in parallel with any other non-root branch. In this embodiment, the parallel branch includes any branch that ends at the same time as any other non-root branch. Various embodiments may distinguish between main branches and parallel branches to exclude branches that run concurrently with each other in a manner that does not or is unlikely to contribute to an overall runtime. Once a span is marked as parallel, that corresponding time interval is also marked as parallel. Even if a span does not run in parallel with another sibling, if it runs inside a time interval marked as parallel, that span's portion is added to the parallel branch because an ancestor ran in parallel.

In one embodiment, a user interface displaying an aggregate span graph includes an option to control which child spans that run in parallel are displayed in the aggregate span graph. In many cases, a particular child span that runs in parallel with the child's sibling spans may have greater relative importance than the siblings, and the option allows fewer than all parallel spans to be viewed, making the graph simpler and easier to analyze. The option may include one or more conditions for filtering in or out the parallel spans from the aggregate graph, as indicated by filter option 314 in FIGS. 3A-3D. For example, the one or more conditions may specify that the n path(s) with the longest duration(s), involving the most microservices, being the closest to the median or mean, and/or having an error triggered from the path are the most important paths and should be the only paths shown in the parallel frame. The functionality of the filter option may be configurable depending on user preference. A spans' parallel siblings and their respective descendants may be discarded or filtered out from the set of traces being displayed based on the filters applied. As another example, the one or more conditions may specify that all child spans be weighted with equal significance and be displayed for analysis. In this case, the flame graph may include all parallel spans in the parallel frame, with increased complexity but with more completeness. The specific decision of which and how many parallel spans to include may vary based on context and user preference.

In one embodiment, if n siblings run in parallel, only one of those siblings (e.g., the one that ends last) is added to the parallel branch. Parallel sections of the rest of the siblings and their descendants may be discarded or filtered out of the visualization. In another embodiment, all siblings are added to the parallel branch as well as their descendants. In yet another embodiment, k of the n siblings are displayed with the remaining n-k siblings being discarded or filtered out of the visualization.

To improve readability and simplicity of the aggregate span graph for analyzing spans that contribute to an overall execution time of the process, some of the parallel branches may be filtered out. The user interface may include options (e.g., checkbox(es), text boxes, and/or drop-down selections) for filtering in or out parallel branches altogether or based on an ordering or filtering criteria that leaves one or more parallel branches included in the visualization and filters out other branches parallel with the included branch. For example, parallel branches may be selected to include longer parallel branches or branches that are concurrent with more other parallel branches to minimize the separate number of parallel branches shown without showing concurrent branches. In another example, parallel branches may be selected to include smaller parallel branches or branches that are concurrent with fewer other parallel branches to maximize the number of separate parallel branches shown without showing concurrent branches. In yet another example, parallel branches may be selected based on the parallel branches ending last and filtering out any branches that are concurrent or partially concurrent with the last ending branch, continuing until all parallel branches have been included or filtered out of the visualization. In yet another example, the most frequently occurring parallel branches are included, and the branches parallel to the most frequently occurring parallel branches are filtered out, continuing until all parallel branches have been included or filtered out of the visualization.

Compiling Aggregate Span Graphs

In one embodiment, aggregate span graphs may be compiled together based on a variety of criteria. For example, aggregate span graphs may be generated for a top 10 or top 10% longest-running instances of a process and a bottom 10 or bottom 10% shortest-running instances of the process to compare aggregate data for the fastest-running instances to aggregate data for the shortest-running instances. The flame graphs may be compared side-by-side or shown layered on top of each other with overlapping portions shown in a different color or with another graphical distinction from non-overlapping portions.

FIG. 3D shows a compilation of graphs 320D including a graph showing median values of a top 5 most time-consuming, or slowest-performing trace of a process ("Top Trace Med"), another graph showing median values of 5 median-performant traces of a process ("Median Trace Med"), and another graph showing a difference between Top Trace Med and Median Trace Med. As shown, Top Trace Med took significantly longer along the main path A→B and parallel path A→C but actually outperformed Median Trace Med on main path A→C. In the Trace Difference graph, the underperforming parts of Top Trace Med are shown stacked on the Top Main and Top Parallel sections of the graph, and the underperforming part of Median Trace Med is shown on top of the Median Main part of the graph.

In one embodiment, the traces may be too dense to visualize on a single aggregate span graph. In one example, a statistics table is generated that displays metrics for each span path, including, for example, the number of traces the span path is found in, the number of unique span paths where the given span path is a substring, and the total, average, and/or maximum time a given span path runs across all traces, with values per path optionally grouped per trace.

Figure 3E:
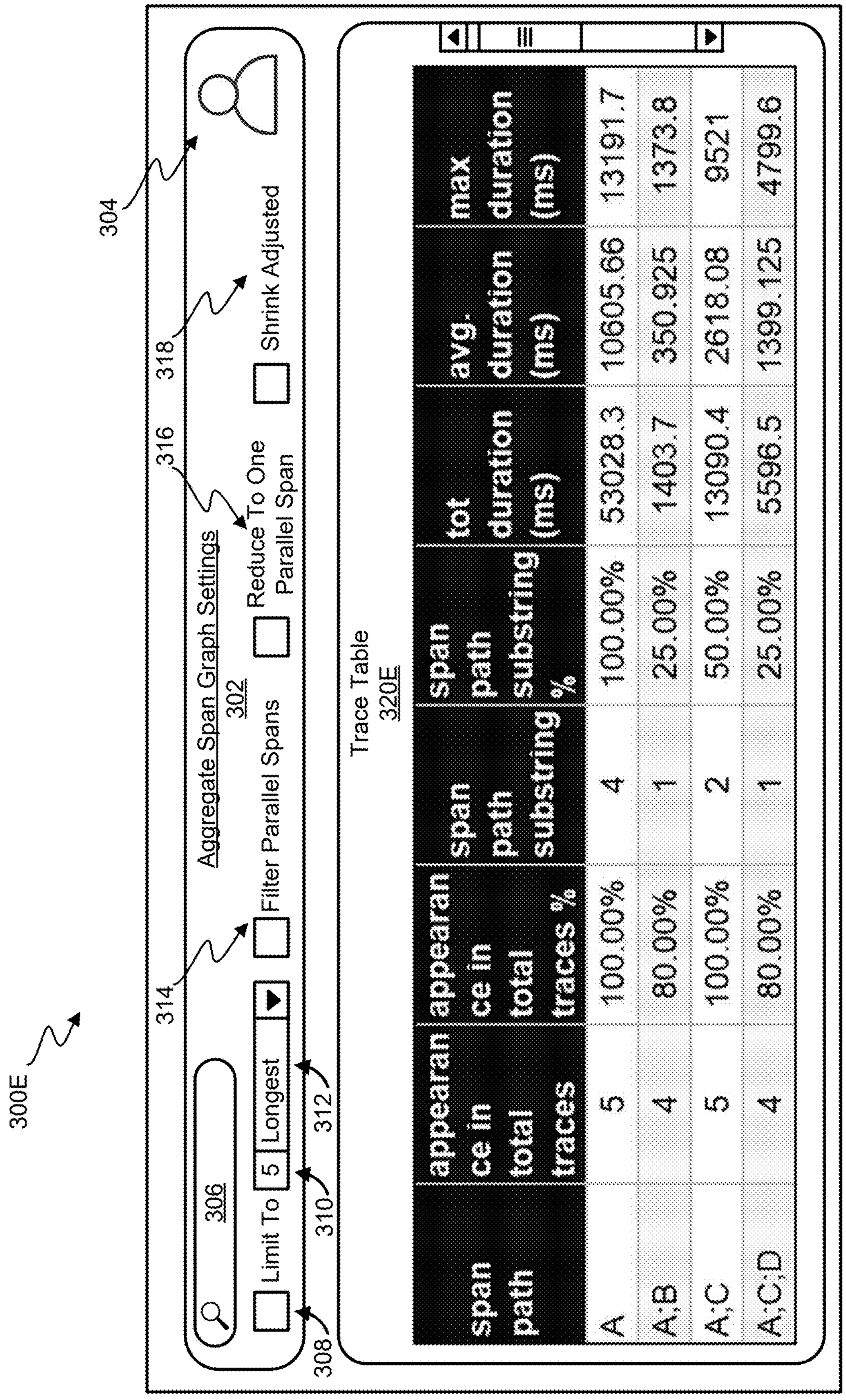
FIG. 3E illustrates a diagram of an example user interface for displaying a trace table showing example aggregate span metrics.

In one example, user interface 300E may show span statistics such as those shown in trace table 320E of FIG. 3E. As shown, trace table 320E tracks how frequently different span paths (A, A→B, A→C, and A→C→D) appear in a sample set of traces of process instances. As shown, paths A and A→C occurred in 5 out of 5 process instances, and paths A→B and A→C→D occurred in 4 out of 5 process instances. The span path substring shows how many unique span paths include the span path as a substring. In the example, all span paths include "A", which could also be called a root path, and half of the span paths include A→C. Only 25% of the unique span paths include A→B and A→C→D, respectively. The total, average, and max durations of consumed time are also shown for each span path from the traces. Any such metrics may also be used as aggregate metrics on an aggregate span graph via a section width, or as additional metrics to show (for example, via color) on the aggregate span graph. In various embodiments, the trace table 320E may be shown concurrently with a corresponding span graph, or may be accessible via a link or reference from the corresponding span graph. Data from the span graph may be cached or stored in a trace table for reconstruction of the span graph at a future time.

Aggregate span graphs may be compiled with widths variably assigned to different values, such as widths identifying total calls, sum, median, and/or mean runtimes per span path in different graphs. Aggregate span graphs may also be used to compare different processes to each other rather than just different instances of the same process. The aggregate span graph shapes of different processes may be analyzed side-by-side or in overlapping manner to compare the efficiencies or inefficiencies of otherwise similar processes.

Multiple graphs may be shown on a user interface concurrently together, and controls may apply to each of the graphs individually or together as a group. For example, a user interface option may be provided to eliminate all or all-but-one parallel branch for each span, or to show all spans including parallel spans, and the option may apply to an individual graph or to all graphs together.

In one embodiment, the "shrink adjusted" box is a feature that can be used to guide generation of the graph. When the shrink adjusted box is checked, the graph is generated after replacing the durations of the spans with specific operation names (e.g fetch) with a fixed value (e.g 100 milliseconds) instead of the actual value captured in the original trace. The shrink adjusted box allows the user to simulate, for example, the projected behavior of the application if certain backend service calls were optimized and made to return in a fixed amount of time (e.g., 100 ms). As another example, the shrink adjusted box may be used to normalize processes that, for example, do not depend on the content of the request and are unable to be further optimized. This allows random variations to be hidden to focus the visualization on meaningful variations.

In one embodiment, a video is generated to show the differences between two aggregate span graphs, highlighting the portions that are different in a portion-by-portion comparison. The video may be generated by clustering the portions of the flame graphs and summarizing differences between graphs cluster by cluster of portions of the graphs. For example, one cluster may involve span paths along a specific path that occur in both graphs, and another cluster may involve span paths without a parent (at the root of the process). The video may zoom into different portions with text or audio explaining the differences shown in the zoomed portion. In another embodiment, rather than a video, a user interface may show arrows, annotations, highlights, circles, ellipses, or other graphical indications that highlight portions of the graphs that are most similar or most different from each other.

In the same or a different embodiment, data summarizing different span paths and attributes of the different span paths may be provided as a prompt to a large language model (LLM) with a request to summarize the biggest differences between datasets provided. The large language model may consume the datasets and guidelines about what the datasets mean, as well as optional examples of other datasets and positively identified differences, to generate a textual summary of the differences between the datasets. The textual summary may be provided in textual or audio format in combination with the aggregate span graph to help identify a portion of the aggregate span graph for focus.

When prompting the LLM, one or more chunks of code may be provided in the prompt to the LLM corresponding to functionality provided in different paths of the aggregate span graph, and the large language model may identify one or more candidate code inefficiencies in the one or more chunks of code to reduce time consumed by the main portions of the process shown in the aggregate span graph. The output of the large language model may be displayed on the user interface to aid in understanding practical steps forward that can be taken with analysis of the aggregate span graph.

Computer System Architecture

Figure 4:
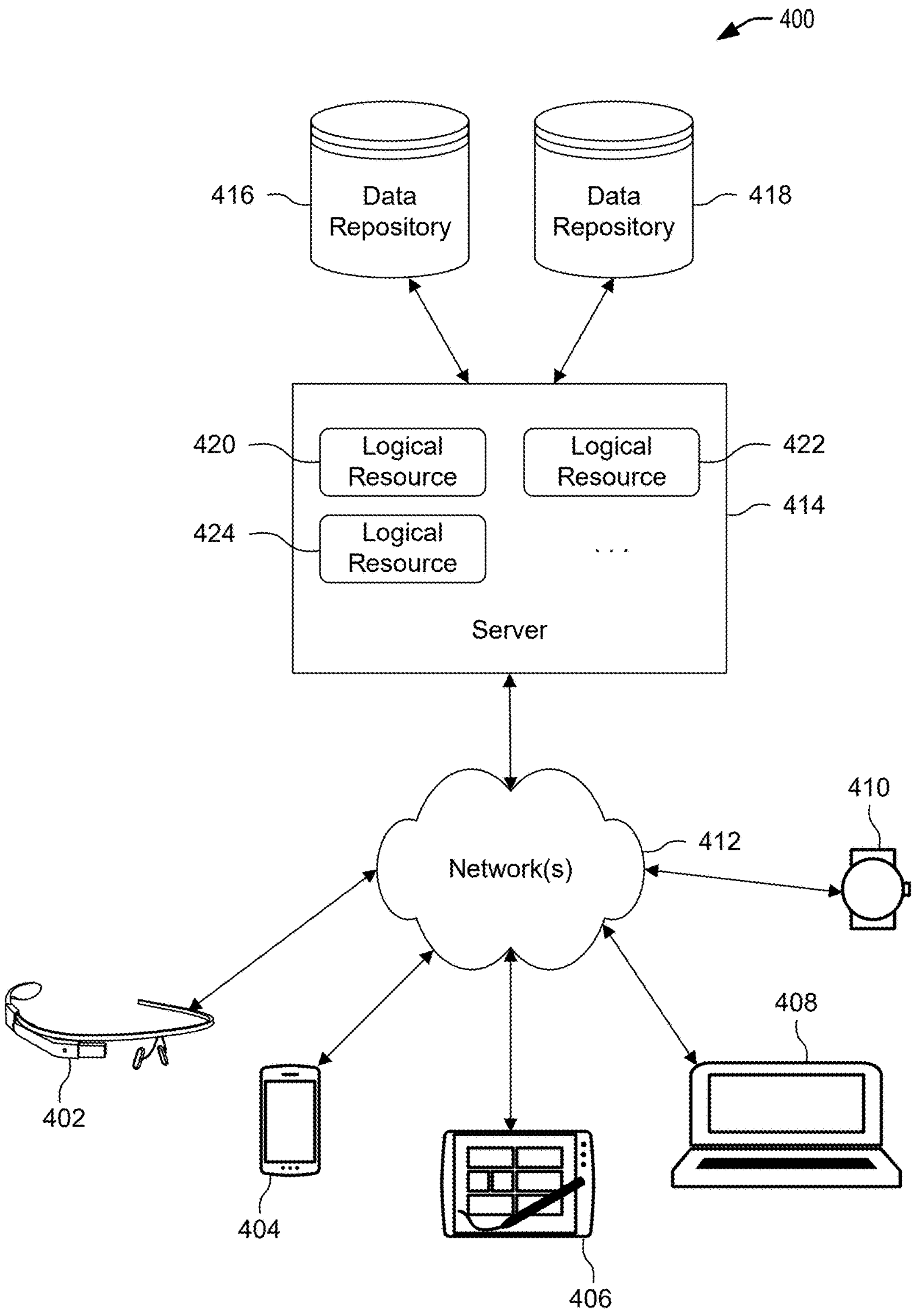
FIG. 4 depicts a simplified diagram of a distributed system for implementing certain aspects.

FIG. 4 depicts a simplified diagram of a distributed system 400 for implementing an embodiment. In the illustrated embodiment, distributed system 400 includes one or more client computing devices 402, 404, 406, 408, and/or 410 coupled to a server 414 via one or more communication networks 412. Clients computing devices 402, 404, 406, 408, and/or 410 may be configured to execute one or more applications.

In various aspects, server 414 may be adapted to run one or more services or software applications that enable techniques for generating and modifying an aggregate span graph having sections that represent spans from section-specific process initiation paths.

In certain aspects, server 414 may also provide other services or software applications that can include non-virtual and virtual environments. In some aspects, these services may be offered as web-based or cloud services, such as under a Software as a Service (SaaS) model to the users of client computing devices 402, 404, 406, 408, and/or 410. Users operating client computing devices 402, 404, 406, 408, and/or 410 may in turn utilize one or more client applications to interact with server 414 to utilize the services provided by these components.

In the configuration depicted in FIG. 4, server 414 may include one or more components 420, 422 and 424 that implement the functions performed by server 414. These components may include software components that may be executed by one or more processors, hardware components, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, 408, and/or 410 for techniques for generating and modifying an aggregate span graph having sections that represent spans from section-specific process initiation paths in accordance with the teachings of this disclosure. A client device may provide an interface that enables a user of the client device to interact with the client device. The client device may also output information to the user via this interface. Although FIG. 4 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 414 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 414 can include one or more virtual machines running virtual operating systems, or other computing architectures involving virtualization such as one or more flexible pools of logical storage devices that can be virtualized to maintain virtual storage devices for the server. In various aspects, server 414 may be adapted to run one or more services or software applications that provide the functionality described in the foregoing disclosure.

The computing systems in server 414 may run one or more operating systems including any of those discussed above, as well as any commercially available server operating system. Server 414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 414 may include one or more applications to analyze and consolidate data feeds and/or event updates received from users of client computing devices 402, 404, 406, 408, and/or 410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 414 may also include one or more applications to display the data feeds and/or real-time events via one or more display devices of client computing devices 402, 404, 406, 408, and/or 410.

Distributed system 400 may also include one or more data repositories 416, 418. These data repositories may be used to store data and other information in certain aspects. For example, one or more of the data repositories 416, 418 may be used to store information for techniques for generating and modifying an aggregate span graph having sections that represent spans from section-specific process initiation paths. Data repositories 416, 418 may reside in a variety of locations. For example, a data repository used by server 414 may be local to server 414 or may be remote from server 414 and in communication with server 414 via a network-based or dedicated connection. Data repositories 416, 418 may be of different types. In certain aspects, a data repository used by server 414 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 416, 418 may also be used by applications to store application data. The data repositories used by applications may be of different types such as, for example, a key-value store repository, an object store repository, or a general storage repository supported by a file system.

In one embodiment, server 414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 5:
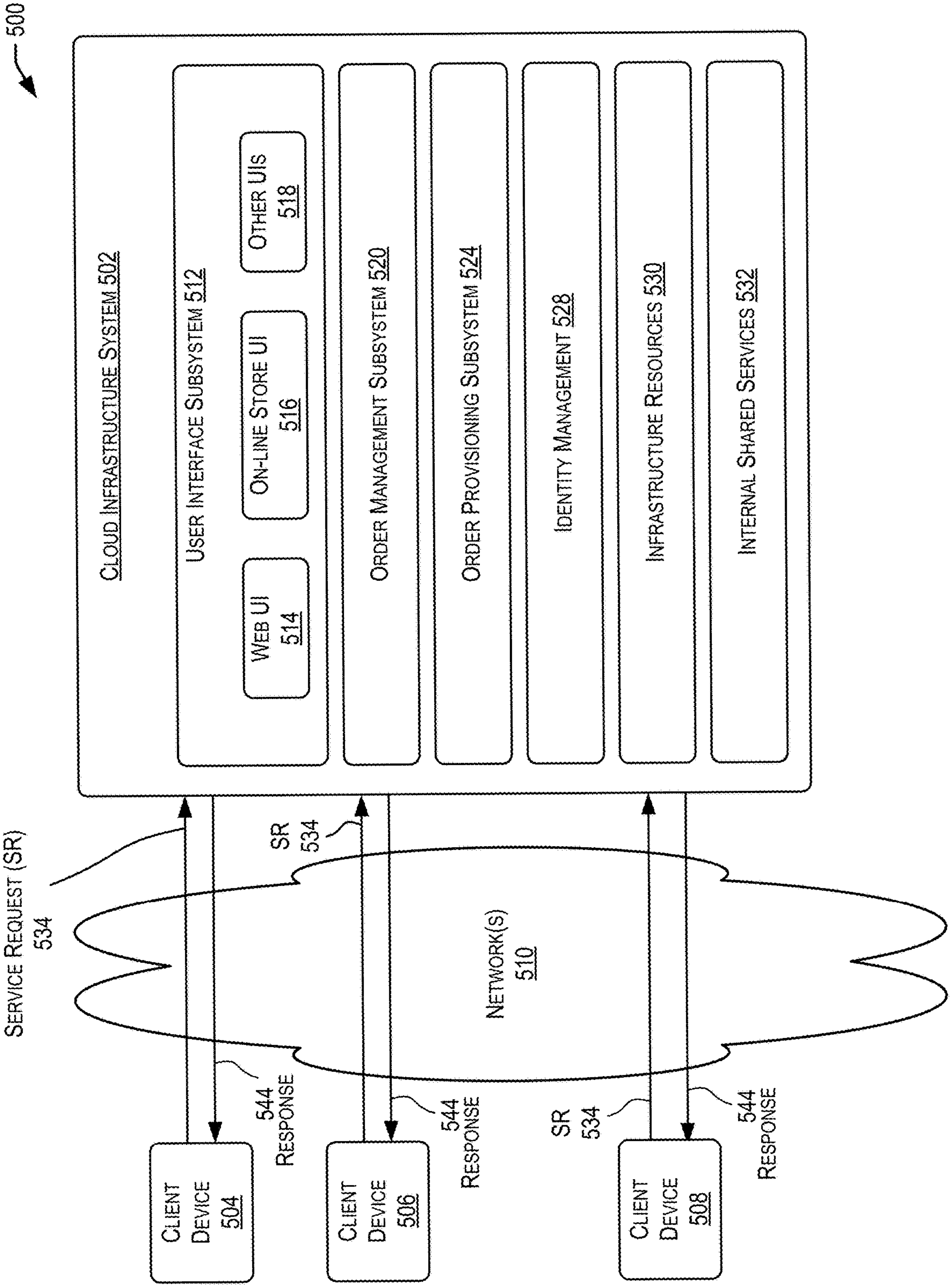
FIG. 5 is a simplified block diagram of one or more components of a system environment by which services provided by one or more components of an embodiment system may be offered as cloud services, in accordance with certain aspects.

FIG. 5 is a simplified block diagram of a cloud-based system environment for generating and modifying an aggregate span graph having sections that represent spans from section-specific process initiation paths, in accordance with certain aspects. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other aspects, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative aspects.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 502 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 502. Cloud infrastructure system 502 then performs processing to provide the services requested in the tenant's subscription order. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public tenant, where the tenant can be an individual or an enterprise. In certain other aspects, under a private cloud model, cloud infrastructure system 502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a service provided by cloud infrastructure system 502.

In some aspects, the processing performed by cloud infrastructure system 502 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain aspects, to facilitate efficient provisioning of these resources for supporting the various cloud services provided by cloud infrastructure system 502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a tenant may, using a client device, request (service request 534) one or more services provided by cloud infrastructure system 502 using one or more of interfaces 514, 516, and 518. For example, a tenant may access the online store, browse cloud services offered by cloud infrastructure system 502, and place a subscription order for one or more services offered by cloud infrastructure system 502 that the tenant wishes to subscribe to. The service request may include information identifying the tenant and one or more services that the tenant desires to subscribe to.

In certain aspects, such as the embodiment depicted in FIG. 5, cloud infrastructure system 502 may comprise an order management subsystem (OMS) 520 that is configured to process the new order. As part of this processing, OMS 520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 502 may send a response or notification 544 to the requesting tenant to indicate when the requested service is now ready for use. In some instances, information (e.g., a link) may be sent to the tenant that enables the tenant to start using and availing the benefits of the requested services.

Cloud infrastructure system 502 may provide services to multiple tenants. For each tenant, cloud infrastructure system 502 is responsible for managing information related to one or more subscription orders received from the tenant, maintaining tenant data related to the orders, and providing the requested services to the tenant or clients of the tenant. Cloud infrastructure system 502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 502 may provide services to multiple tenants in parallel. Cloud infrastructure system 502 may store information for these tenants, including possibly proprietary information. In certain aspects, cloud infrastructure system 502 comprises an identity management subsystem (IMS) 528 that is configured to manage tenant's information and provide the separation of the managed information such that information related to one tenant is not accessible by another tenant. IMS 528 may be configured to provide various security-related services such as identity services, such as information access management, authentication and authorization services, services for managing tenant identities and roles and related capabilities, and the like.

Figure 6:
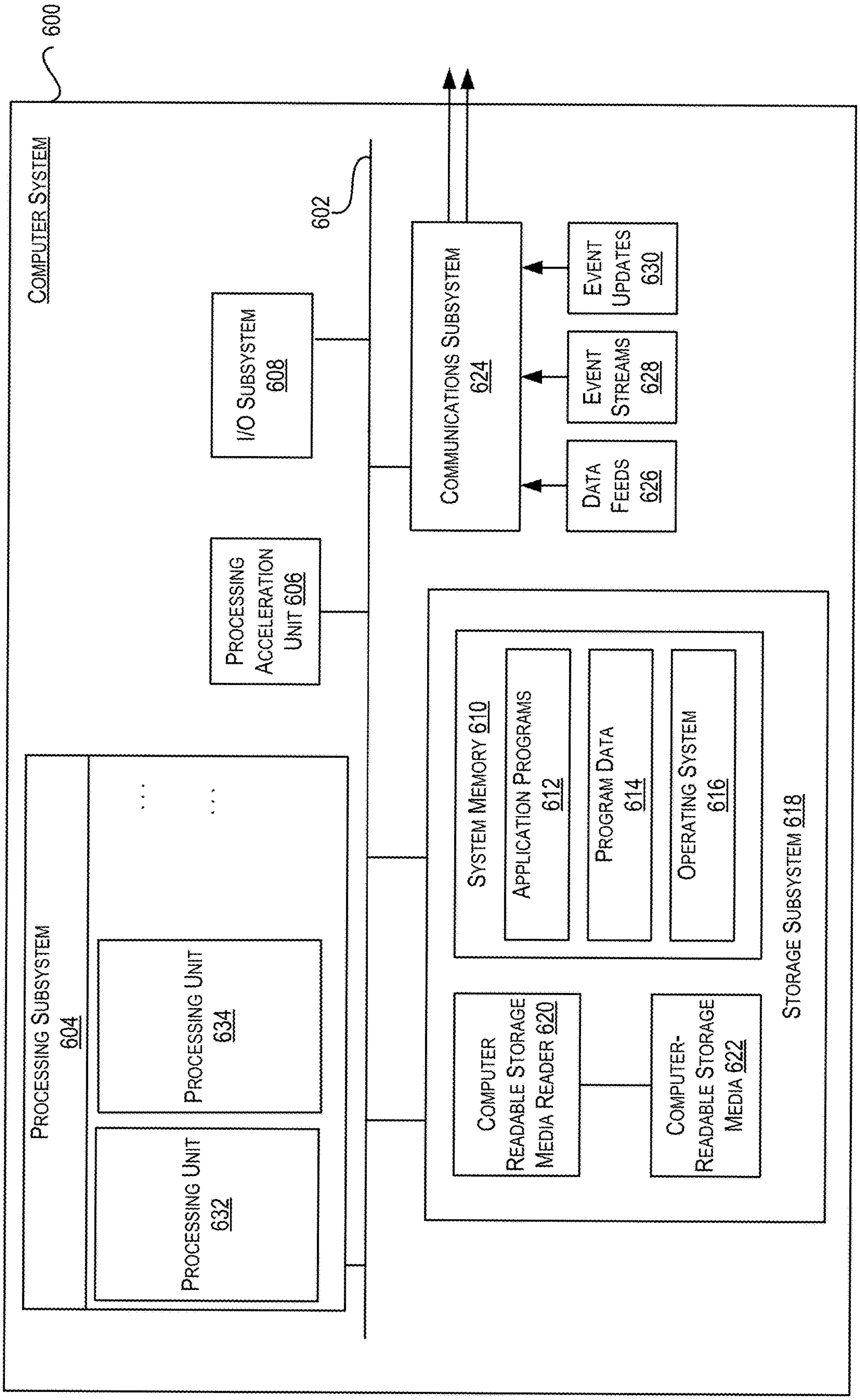
FIG. 6 illustrates an example computer system that may be used to implement certain aspects.

FIG. 6 illustrates an exemplary computer system 600 that may be used to implement certain aspects. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative aspects of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some aspects, processing subsystem 604 can include one or more special purpose co-processors such as graphics processors, digital signal processors (DSPs), or the like. In some aspects, some or all of the processing units of processing subsystem 604 can be implemented using customized circuits, such as application specific integrated circuits (ASICs), or field programmable gate arrays (FPGAs).

In some aspects, the processing units in processing subsystem 604 can execute instructions stored in system memory 610 or on computer readable storage media 622. In various aspects, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain aspects, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some aspects. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 622 may store programming and data constructs that provide the functionality of some aspects. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, digital video disc (DVD), a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 618 may also include a computer-readable storage media reader 620 that can further be connected to computer-readable storage media 622. Reader 620 may receive and be configured to read data from a memory device such as a disk, a flash drive, etc.

In certain aspects, computer system 600 may support virtualization technologies, including but not limited to virtualization of processing and memory resources. For example, computer system 600 may provide support for executing one or more virtual machines. In certain aspects, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain aspects, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 624 can provide wired network connectivity (e.g., Ethernet) in addition to or instead of a wireless interface.

Communication subsystem 624 can receive and transmit data in various forms. For example, in some aspects, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

receiving process monitoring data, wherein the process monitoring data comprises:

a first set of process monitoring data reporting on a first instance of a first process that handled part of a first request, wherein the first set of process monitoring data comprises a first run time of the first instance of the first process; and a second set of process monitoring data reporting on a first instance of a second process that handled part of the first request, wherein the second set of process monitoring data comprises a second run time of the first instance of the second process;

a third set of process monitoring data reporting on a second instance of a first process that handled part of a second request, wherein the third set of process monitoring data comprises a third run time of the second instance of the first process; and a fourth set of process monitoring data reporting on a second instance of a second process that handled part of the second request, wherein the fourth set of process monitoring data comprises a fourth run time of the second instance of the second process;

using the process monitoring data to generate a structured object, wherein the structured object identifies a plurality of spans of processing time corresponding to a plurality of processes handling a plurality of parts of requests, wherein the structured object includes, for each span, of the plurality of spans, corresponding to a process of the plurality of processes:

a unique identity of the span, a name of the process corresponding to the span, if the process was initiated by a parent process, an identity of a parent span corresponding to the parent process, and a time during which the process ran;

based at least in part on the structured object, generating a graph comprising a plurality of sections, wherein each section of the plurality of sections represents spans having a process initiation path corresponding to the section; wherein a width of the section is based at least in part on an aggregate metric for spans having the process initiation path corresponding to the section; and wherein the graph comprises sections corresponding to child spans stacked on other sections corresponding to parent spans.

2. The computer-implemented method of claim 1, further comprising:

receiving a selection of an option to filter out parallel spans from the graph; and based on the selection, filtering, from the graph, one or more particular spans that are parallel to one or more other spans based on one or more processes corresponding to the one or more particular spans not independently contributing to a total runtime of request handling, without filtering, from the graph, one or more particular other spans that are not parallel to one or more other spans based on one or more other processes corresponding to the one or more other particular spans independently contributing to the total runtime of request handling.

3. The computer-implemented method of claim 1, further comprising:

showing, in a first region of the graph, one or more particular spans that are parallel to one or more other spans based on one or more processes corresponding to the one or more particular spans not independently contributing to a total runtime of request handling, and showing, in a second region of the graph, one or more other spans that are not parallel to other spans based on one or more other processes corresponding to the one or more particular other spans independently contributing to the total runtime of request handling.

4. The computer-implemented method of claim 1, further comprising:

displaying an option to stack the sections corresponding to child spans on top of the sections corresponding to parent spans, under the sections corresponding to parent spans, to the left of the sections corresponding to parent spans, or to the right of the sections corresponding to parent spans;

upon receiving a selection of an option that does not match the graph, adjusting an orientation of the graph.

5. The computer-implemented method of claim 1, further comprising:

receiving a selection of a particular process to include in the graph, wherein the particular process comprises the first process and the second process; and based on the selection, adding, to the graph, spans corresponding to at least the first process and the second process;

wherein at least some process names overlap between different instances of the particular process.

6. The computer-implemented method of claim 1, further comprising:

receiving a selection of a first particular process and a second particular process to include in the graph, wherein the first particular process comprises the first process and the second process; and based on the selection, adding, to the graph, spans corresponding to at least the first particular process and spans corresponding to at least the second particular process; wherein at least some process names do not overlap between the first particular process and the second particular process.

7. The computer-implemented method of claim 1, wherein the plurality of sections are colored based at least in part on, for each section, another aggregate matric for spans having the process initiation path corresponding to the section.

8. The computer-implemented method of claim 1, wherein the aggregate metric for spans having the process initiation path corresponding to the section comprises a sum, median, or mean of metric values for spans having the process initiation path corresponding to the section.

9. The computer-implemented method of claim 1, wherein the aggregate metric for spans having the process initiation path corresponding to the section comprises a frequency of spans having the process initiation path corresponding to the section.

10. The computer-implemented method of claim 1, wherein the graph is a first graph, the computer-implemented method further comprising:

receiving a selection of one or more criteria for the first graph and one or more other criteria for a second graph, wherein the one or more criteria differ from the one or more other criteria; and displaying the first graph and the second graph concurrently, wherein the first graph and the second graph differ based on differences between the one or more criteria and the one or more other criteria.

11. A computer-program product comprising one or more non-transitory machine-readable storage media, including stored instructions configured to cause a computing system to perform a set of actions including:

receiving process monitoring data, wherein the process monitoring data comprises:

a first set of process monitoring data reporting on a first instance of a first process that handled part of a first request, wherein the first set of process monitoring data comprises a first run time of the first instance of the first process; and a second set of process monitoring data reporting on a first instance of a second process that handled part of the first request, wherein the second set of process monitoring data comprises a second run time of the first instance of the second process;

a third set of process monitoring data reporting on a second instance of a first process that handled part of a second request, wherein the third set of process monitoring data comprises a third run time of the second instance of the first process; and a fourth set of process monitoring data reporting on a second instance of a second process that handled part of the second request, wherein the fourth set of process monitoring data comprises a fourth run time of the second instance of the second process;

using the process monitoring data to generate a structured object, wherein the structured object identifies a plurality of spans of processing time corresponding to a plurality of processes handling a plurality of parts of requests, wherein the structured object includes, for each span, of the plurality of spans, corresponding to a process of the plurality of processes:

a unique identity of the span, a name of the process corresponding to the span, if the process was initiated by a parent process, an identity of a parent span corresponding to the parent process, and a time during which the process ran;

based at least in part on the structured object, generating a graph comprising a plurality of sections, wherein each section of the plurality of sections represents spans having a process initiation path corresponding to the section; wherein a width of the section is based at least in part on an aggregate metric for spans having the process initiation path corresponding to the section; and wherein the graph comprises sections corresponding to child spans stacked on other sections corresponding to parent spans.

12. The computer-program product of claim 11, wherein the set of actions further includes:

receiving a selection of an option to filter out parallel spans from the graph; and based on the selection, filtering, from the graph, one or more particular spans that are parallel to one or more other spans based on one or more processes corresponding to the one or more particular spans not independently contributing to a total runtime of request handling, without filtering, from the graph, one or more particular other spans that are not parallel to one or more other spans based on one or more other processes corresponding to the one or more other particular spans independently contributing to the total runtime of request handling.

13. The computer-program product of claim 11, wherein the set of actions further includes:

showing, in a first region of the graph, one or more particular spans that are parallel to one or more other spans based on one or more processes corresponding to the one or more particular spans not independently contributing to a total runtime of request handling, and showing, in a second region of the graph, one or more other spans that are not parallel to other spans based on one or more other processes corresponding to the one or more particular other spans independently contributing to the total runtime of request handling.

14. The computer-program product of claim 11, wherein the aggregate metric for spans having the process initiation path corresponding to the section comprises a sum, median, or mean of metric values for spans having the process initiation path corresponding to the section.

15. The computer-program product of claim 11, wherein the aggregate metric for spans having the process initiation path corresponding to the section comprises a frequency of spans having the process initiation path corresponding to the section.

16. A system comprising:

one or more processors;

one or more non-transitory computer-readable media storing instructions, which, when executed by the system, cause the system to perform a set of actions including:

receiving process monitoring data, wherein the process monitoring data comprises:

a first set of process monitoring data reporting on a first instance of a first process that handled part of a first request, wherein the first set of process monitoring data comprises a first run time of the first instance of the first process; and a second set of process monitoring data reporting on a first instance of a second process that handled part of the first request, wherein the second set of process monitoring data comprises a second run time of the first instance of the second process;

a third set of process monitoring data reporting on a second instance of a first process that handled part of a second request, wherein the third set of process monitoring data comprises a third run time of the second instance of the first process; and a fourth set of process monitoring data reporting on a second instance of a second process that handled part of the second request, wherein the fourth set of process monitoring data comprises a fourth run time of the second instance of the second process;

using the process monitoring data to generate a structured object, wherein the structured object identifies a plurality of spans of processing time corresponding to a plurality of processes handling a plurality of parts of requests, wherein the structured object includes, for each span, of the plurality of spans, corresponding to a process of the plurality of processes:

a unique identity of the span, a name of the process corresponding to the span, if the process was initiated by a parent process, an identity of a parent span corresponding to the parent process, and a time during which the process ran;

based at least in part on the structured object, generating a graph comprising a plurality of sections, wherein each section of the plurality of sections represents spans having a process initiation path corresponding to the section; wherein a width of the section is based at least in part on an aggregate metric for spans having the process initiation path corresponding to the section; and wherein the graph comprises sections corresponding to child spans stacked on other sections corresponding to parent spans.

17. The system of claim 16, wherein the set of actions further includes:

receiving a selection of an option to filter out parallel spans from the graph; and based on the selection, filtering, from the graph, one or more particular spans that are parallel to one or more other spans based on one or more processes corresponding to the one or more particular spans not independently contributing to a total runtime of request handling, without filtering, from the graph, one or more particular other spans that are not parallel to one or more other spans based on one or more other processes corresponding to the one or more other particular spans independently contributing to the total runtime of request handling.

18. The system of claim 16, wherein the set of actions further includes:

showing, in a first region of the graph, one or more particular spans that are parallel to one or more other spans based on one or more processes corresponding to the one or more particular spans not independently contributing to a total runtime of request handling, and showing, in a second region of the graph, one or more other spans that are not parallel to other spans based on one or more other processes corresponding to the one or more particular other spans independently contributing to the total runtime of request handling.

19. The system of claim 16, wherein the aggregate metric for spans having the process initiation path corresponding to the section comprises a sum, median, or mean of metric values for spans having the process initiation path corresponding to the section.

20. The system of claim 16, wherein the aggregate metric for spans having the process initiation path corresponding to the section comprises a frequency of spans having the process initiation path corresponding to the section.

* * * * *